United States Patent
Furuta

(10) Patent No.: US 11,932,074 B2
(45) Date of Patent: Mar. 19, 2024

(54) DAMPING CONTROL DEVICE FOR VEHICLE, DAMPING CONTROL SYSTEM, DAMPING CONTROL METHOD, AND DATA PROVIDING DEVICE

(71) Applicant: Toyota Jidosha Kabushiki Kaisha, Toyota Aichi-ken (JP)

(72) Inventor: Hiroki Furuta, Numazu (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 469 days.

(21) Appl. No.: 17/224,438

(22) Filed: Apr. 7, 2021

(65) Prior Publication Data

US 2021/0331545 A1    Oct. 28, 2021

(30) Foreign Application Priority Data

Apr. 28, 2020 (JP) ................. 2020-079732

(51) Int. Cl.
*B60G 17/018* (2006.01)
*B60G 17/0165* (2006.01)

(52) U.S. Cl.
CPC ....... *B60G 17/018* (2013.01); *B60G 17/0165* (2013.01); *B60G 2400/252* (2013.01); *B60G 2400/91* (2013.01); *B60G 2500/10* (2013.01); *B60G 2600/60* (2013.01)

(58) Field of Classification Search
CPC . B60G 17/0157; B60G 17/018; B60G 17/015
See application file for complete search history.

(56) References Cited

U.S. PATENT DOCUMENTS

| | | | |
|---|---|---|---|
| 9,428,184 B2* | 8/2016 | Kikuchi | B60W 30/025 |
| 2010/0324780 A1 | 12/2010 | Koumura et al. | |
| 2014/0005888 A1* | 1/2014 | Bose | B60G 17/0165 701/37 |
| 2014/0071717 A1* | 3/2014 | Murata | H02M 3/33507 363/21.17 |
| 2014/0195112 A1* | 7/2014 | Lu | B60G 17/015 703/2 |

(Continued)

FOREIGN PATENT DOCUMENTS

| | | |
|---|---|---|
| DE | 102015107701 A1 | 11/2016 |
| DE | 102016206604 A1 | 10/2017 |

(Continued)

*Primary Examiner* — Long T Tran
(74) *Attorney, Agent, or Firm* — Dinsmore & Shohl LLP

(57) ABSTRACT

A damping control device is configured to acquire, as a preview condition amount, an unsprung condition amount at a predicted passing position where a wheel of a vehicle is predicted to pass, based on preview reference data being sets of data in which unsprung condition amounts and pieces of positional information of the wheel are linked to each other. The unsprung condition amounts indicate a displacement condition of an unsprung portion displaced in a vertical direction due to a displacement of a road surface acquired when the vehicle has traveled on the road surface. The damping control device is configured to execute, at a timing when the wheel passes through the predicted passing position, preview damping control to cause control force to agree with a target control force.

13 Claims, 12 Drawing Sheets

(56) References Cited

U.S. PATENT DOCUMENTS

| | | | |
|---|---|---|---|
| 2014/0316637 A1* | 10/2014 | Rhode | B60G 17/0182 701/29.1 |
| 2015/0046035 A1* | 2/2015 | Kikuchi | B60G 17/0195 701/37 |
| 2015/0290995 A1* | 10/2015 | Kanda | B60G 17/0182 701/37 |
| 2015/0367702 A1* | 12/2015 | Kubota | B60G 17/0165 701/37 |
| 2016/0339990 A1 | 11/2016 | Walthert et al. | |
| 2018/0082492 A1* | 3/2018 | Stanek | G07C 5/0808 |
| 2018/0113055 A1* | 4/2018 | Kubota | B60G 17/018 |
| 2018/0154723 A1 | 6/2018 | Anderson et al. | |
| 2018/0162186 A1 | 6/2018 | Anderson et al. | |
| 2019/0079539 A1* | 3/2019 | Sridhar | G05D 1/0231 |
| 2020/0139784 A1* | 5/2020 | Sridhar | B60G 21/08 |
| 2020/0198429 A1* | 6/2020 | Okubo | B60G 17/019 |
| 2020/0324609 A1 | 10/2020 | Barecke et al. | |
| 2021/0291607 A1 | 9/2021 | Akai et al. | |

FOREIGN PATENT DOCUMENTS

| | | |
|---|---|---|
| DE | 102017206055 A1 | 10/2017 |
| DE | 102016225351 A1 | 6/2018 |
| EP | 2209658 B1 | 4/2013 |
| JP | 2009-096366 A | 5/2009 |
| JP | 2012-066629 A | 4/2012 |
| JP | 2016-107778 A | 6/2016 |
| JP | 2017-226270 A | 12/2017 |
| WO | 2020/031652 A1 | 2/2020 |

\* cited by examiner

DAMPING CONTROL DEVICE FOR VEHICLE, DAMPING CONTROL SYSTEM, DAMPING CONTROL METHOD, AND DATA PROVIDING DEVICE

CROSS-REFERENCE TO RELATED APPLICATION

This application claims priority to Japanese Patent Application No. 2020-079732 filed on Apr. 28, 2020, incorporated herein by reference in its entirety.

BACKGROUND

1. Technical Field

The present disclosure relates to a damping control device for a vehicle, a damping control system, a damping control method, and a data providing device. The damping control device for the vehicle, the damping control system, the damping control method, and the data providing device are used to, for example, acquire an unsprung condition amount at a predicted passing position where a wheel is predicted to pass, and control a control force for damping a sprung portion based on the acquired unsprung condition amount.

2. Description of Related Art

There is known a damping control device for a vehicle, which is configured to calculate a target control force for damping a sprung portion based on a displacement of a road surface ahead of a current contact position of a wheel, and generate control force that agrees with the target control force. The damping control based on a displacement at a forward position is referred to also as "preview damping control". For example, a device described in U.S. Patent Application Publication No. 2018/154723 (US 2018/154723 A) performs the preview damping control based on preview reference data containing positional information of a vehicle and road surface information. The preview reference data is stored in a server communicable with the device of the above document. The device of the above document uses the preview reference data by downloading the preview reference data from the server. The road surface information contained in the preview reference data to be used by the device of the above document is a value indicating a displacement of a road surface (road surface displacement), and is generated based on sensing data acquired by a preview sensor such as a camera sensor, a Light Detection and Ranging (LIDAR) sensor, a radar, or a plane or three-dimensional scanning sensor.

SUMMARY

Damping performance of the preview damping control for the sprung portion using the target control force calculated based on the road surface displacement is lower than damping performance of preview damping control for the sprung portion using a target control force calculated based on an unsprung condition amount indicating a vertical displacement condition of an unsprung portion. The reasons for this fact are described below with reference to an example illustrated in FIG. 1.

FIG. 1 illustrates a single-wheel model of a vehicle on a road surface 55. As illustrated in FIG. 1, a spring 52, a damper 53, and an actuator 54 are arranged in parallel between an unsprung portion 50 and a sprung portion 51. The actuator 54 generates the control force. A mass of the unsprung portion 50 is referred to as "unsprung mass $m_1$". A mass of the sprung portion 51 is referred to as "sprung mass $m_2$". A vertical displacement of the road surface 55 is referred to as "road surface displacement $z_0$". A vertical displacement of the unsprung portion 50 is referred to as "unsprung displacement $z_1$". A vertical displacement of the sprung portion 51 is referred to as "sprung displacement $z_2$". A spring rate (equivalent spring rate) of the spring 52 is referred to as "spring rate K". A spring rate of a tire of the wheel is referred to as "spring rate Kt". A damping coefficient (equivalent damping coefficient) of the damper 53 is referred to as "damping coefficient C". Control force generated by the actuator 54 is referred to as "control force Fc".

Time derivatives of $z_0$, $z_1$, and $z_2$ are represented by "$dz_0$", "$dz_1$", and "$dz_2$", respectively. Second-order time derivatives of $z_1$ and $z_2$ are represented by "$ddz_1$" and "$ddz_2$", respectively. In the following description, an upward displacement of each of $z_0$, $z_1$, and $z_2$ is defined to be positive, and an upward force generated by each of the spring 52, the damper 53, and the actuator 54 is defined to be positive.

In the single-wheel model illustrated in FIG. 1, an equation of motion regarding a vertical motion of the sprung portion 51 can be represented by Expression (1), and an equation of motion regarding a vertical motion of the unsprung portion 50 can be represented by Expression (2).

$$m_d ddz_2 = C(dz_1 - dz_2) + K(z_1 - z_2) - Fc \quad (1)$$

$$m_1 ddz_1 = C(dz_2 - dz_1) + K(z_2 - z_1) + Kt(z_0 - z_1) + Fc \quad (2)$$

Vibration of the sprung displacement $z_2$ when the control force Fc is represented based on the road surface displacement $z_0$ as in Expression (3) is discussed. In Expression (3), $\alpha_0$ is an arbitrary constant larger than 0 and equal to or smaller than 1.

$$Fc = \alpha_0 (C dz_0 + K z_0) \quad (3)$$

Expression (4) is obtained when an expression obtained through Laplace transform after Expression (3) is applied to Expression (1) and an expression obtained through Laplace transform after Expression (3) is applied to Expression (2) are rearranged. That is, a transfer function $(z_2/z_0)$ from the road surface displacement $z_0$ to the sprung displacement $z_2$ is represented by Expression (4). A symbol "s" represents a Laplace operator.

$$\frac{z_2}{z_0} = \frac{-m_1\alpha_0(Cs^2 + Ks^2) + (1-\alpha_0)(Cs+K)Kt}{m_1 m_2 s^4 + C(m_1 + m_2)s^3 + \{m_1 K + m_2(K+Kt)\}s^2 + CKts + KKt} \quad (4)$$

Vibration of the sprung displacement $z_2$ when the control force Fc is represented based on the unsprung displacement $z_1$ as in Expression (5) is discussed. In Expression (5), $\alpha$ is an arbitrary constant larger than 0 and equal to or smaller than 1.

$$Fc = \alpha(C dz_1 + K z_1) \quad (5)$$

Expression (6) is obtained when an expression obtained through Laplace transform after Expression (5) is applied to Expression (1) and an expression obtained through Laplace transform after Expression (5) is applied to Expression (2) are rearranged. That is, the transfer function $(z_2/z_0)$ is represented by Expression (6).

$$\frac{z_2}{z_0} = \frac{(1-\alpha)(Cs+K)Kt}{m_1m_2s^4 + C(m_1+m_2)s^3 + \{m_1K + m_2(K+Kt)\}s^2 + CKts + KKt} \quad (6)$$

According to Expression (4), the term "$-m_1\alpha_0(Cs^2+Ks^2)$" remains even when $\alpha_0$ is "1". According to Expression (6), the transfer function ($z_2/z_0$) is "0" when $\alpha$ is "1". Therefore, vibration of the sprung portion 51 is completely canceled out. Thus, damping performance of preview damping control for the sprung portion 51 using a target control force calculated based on Expression (3) (that is, a target control force calculated based on the road surface displacement $z_0$) is lower than damping performance of preview damping control for the sprung portion 51 using a target control force calculated based on Expression (5) (that is, a target control force calculated based on the unsprung displacement $z_1$).

Since the road surface displacement contained in the preview reference data is acquired based on the sensing data (for example, image data) acquired by the preview sensor, there is a strong possibility that a deviation from an actual road surface displacement increases.

In view of the above, there is a strong possibility that the device of the above document cannot appropriately damp the sprung portion because the preview damping control is performed based on the road surface displacement. That is, according to the device of the above document, there is a strong possibility that the damping performance of the preview damping control decreases.

The present disclosure provides a damping control device for a vehicle, a damping control system, a damping control method, and a data providing device in which damping performance of preview damping control can be improved.

A first aspect of the present disclosure relates to a damping control device for a vehicle. The damping control device includes control force generating device and an electronic control unit. The control force generating device is configured to and to generate a vertical control force for damping a sprung portion of the vehicle between at least one wheel and a portion of a vehicle body that corresponds to a position of the wheel. The electronic control unit is configured to control the control force generating device to change the control force. The electronic control unit is configured to acquire, as a preview condition amount, an unsprung condition amount at a predicted passing position where the wheel of the vehicle is predicted to pass at a timing when a predetermined period has elapsed from a current time, based on preview reference data being sets of data in which unsprung condition amounts and pieces of positional information are linked to each other. The unsprung condition amounts indicate a displacement condition of an unsprung portion actually displaced in a vertical direction due to a displacement of a road surface that is acquired when at least one of the vehicle and another vehicle has actually traveled on the road surface. The pieces of positional information are available to determine a position of the wheel when the unsprung condition amount is acquired. The electronic control unit is configured to execute, at a timing when the wheel passes through the predicted passing position, preview damping control for controlling the control force generating device to cause the control force generated by the control force generating device to agree with a target control force being a target value of the control force that is calculated based on the preview condition amount.

The preview reference data of the damping control device contains the unsprung condition amount, and the damping control device executes the preview damping control by using the target control force calculated based on the unsprung condition amount. Thus, the damping control device can improve the damping performance for the sprung portion as compared to the preview damping control using the target control force calculated based on the road surface displacement. Further, the unsprung condition amount contained in the preview reference data of the damping control device is "value indicating vertical displacement condition of unsprung portion actually moved in vertical direction due to displacement of road surface" that is acquired when at least one of the vehicle and another vehicle has actually traveled on the road surface. Therefore, the unsprung condition amount contained in the preview reference data of the damping control device has a lower possibility of including a deviation than that of the road surface displacement in the device of the above document. According to the first aspect described above, the damping performance of the preview damping control can be improved such that the sprung portion can be damped appropriately because the damping control device executes the preview damping control by using the unsprung condition amount contained in the preview reference data.

In the first aspect, the unsprung condition amount contained in the preview reference data may be an unsprung condition amount subjected to filtering for removing a frequency component lower than a predetermined first cutoff frequency that is lower than a predetermined sprung resonance frequency.

Although the unsprung condition amount contained in the preview reference data has a lower possibility of including a deviation than that of the road surface displacement in the device of the above document, an unsprung condition amount in a low-frequency range (frequency range lower than the first cutoff frequency) may include a relatively large deviation due to a sensor drift. According to the configuration described above, the low frequency component (frequency component lower than the first cutoff frequency) is removed from the unsprung condition amount contained in the preview reference data. Therefore, the unsprung condition amount in the low-frequency range including the deviation due to the sensor drift is not saved as preview data. Since this unsprung condition amount is not used in the preview damping control, the damping performance of the preview damping control can be improved, and the possibility of vibration of the sprung portion can also be reduced through the preview damping control.

In the first aspect, the unsprung condition amount contained in the preview reference data may be an unsprung condition amount subjected to filtering for removing a frequency component higher than a predetermined second cutoff frequency between a sprung resonance frequency of a predetermined vehicle and an unsprung resonance frequency of the predetermined vehicle.

An unsprung condition amount when the unsprung portion resonates may include a relatively large deviation. According to the configuration described above, "frequency component higher than predetermined second cutoff frequency that is lower than unsprung resonance frequency" is removed from the unsprung condition amount contained in the preview reference data. Therefore, the unsprung condition amount including the deviation due to the resonance of the unsprung portion is not saved as the preview reference data. Since this unsprung condition amount is not used in the preview damping control, the damping performance of the preview damping control can be improved, and the possibility of vibration of the sprung portion can also be reduced through the preview damping control.

In the first aspect, the unsprung condition amount contained in the preview reference data may be an unsprung condition amount subjected to filtering for removing a frequency component lower than a predetermined first cutoff frequency that is lower than a predetermined sprung resonance frequency, and removing a frequency component higher than a predetermined second cutoff frequency between the sprung resonance frequency and an unsprung resonance frequency of the vehicle.

The "unsprung condition amount in low-frequency range including deviation due to sensor drift" and the "unsprung condition amount including deviation due to resonance of unsprung portion" need not be saved as the preview reference data. Since those unsprung condition amounts are not used in the preview damping control in the configuration described above, the damping performance of the preview damping control can be improved, and the possibility of vibration of the sprung portion can also be reduced through the preview damping control.

In the first aspect, the electronic control unit may be configured to acquire, based on the preview reference data, an unsprung condition amount at the predicted passing position as a low-frequency-side unsprung condition amount from among unsprung condition amounts from which a frequency component higher than a predetermined discrimination threshold frequency is removed. The electronic control unit may be configured to acquire, based on the preview reference data, an unsprung condition amount at the predicted passing position as a high-frequency-side unsprung condition amount from among unsprung condition amounts from which a frequency component equal to or lower than the discrimination threshold frequency is removed. The electronic control unit may be configured to acquire the target control force by adding together a value obtained by multiplying the low-frequency-side unsprung condition amount by a predetermined low-frequency-side gain and a value obtained by multiplying the high-frequency-side unsprung condition amount by a predetermined high-frequency-side gain larger than the low-frequency-side gain.

The possibility that the unsprung condition amount in the high-frequency-side frequency range higher than the discrimination threshold frequency is smaller than the unsprung condition amount related to the actual road surface displacement may be stronger than the possibility that the unsprung condition amount in the low-frequency-side frequency range equal to or lower than the discrimination threshold frequency is smaller than the unsprung condition amount related to the actual road surface displacement. According to the configuration described above, the low-frequency-side gain and the "high-frequency-side gain larger than low-frequency-side gain" are used when calculating the target control force. Therefore, it is possible to reduce the possibility that the high-frequency-side target control force is smaller than the control force necessary for the actual road surface displacement. Thus, the sprung portion can be damped appropriately through the preview damping control, and the damping performance of the preview damping control can be improved.

In the first aspect, the unsprung condition amount contained in the preview reference data may be an unsprung displacement or a speed of the unsprung displacement. The unsprung displacement is a vertical displacement of the unsprung portion that is acquired based on a vertical motion condition amount of at least one of the sprung portion and the unsprung portion.

According to the configuration described above, the unsprung condition amount is calculated based on the vertical motion condition amount of at least one of the sprung portion and the unsprung portion. Thus, a more accurate value can be calculated.

A second aspect of the present disclosure relates to a damping control system. The damping control system includes a vehicle and a storage device. The vehicle is configured to control a control force generating device to change a vertical control force for damping a sprung portion. The control force generating device is configured to generate the control force between at least one wheel and a portion of a vehicle body that corresponds to a position of the wheel. The storage device is configured to connect to the vehicle via a network, and prestores preview reference data being sets of data in which unsprung condition amounts and pieces of positional information are linked to each other. The unsprung condition amounts indicate a displacement condition of an unsprung portion actually displaced in a vertical direction due to a displacement of a road surface that is acquired when at least one of the vehicle and another vehicle has actually traveled on the road surface. The pieces of positional information are available to determine a position of the wheel when the unsprung condition amount is acquired. The storage device is configured to provide the preview reference data to the vehicle. The vehicle is configured to acquire, as a preview condition amount, an unsprung condition amount at a predicted passing position where the wheel is predicted to pass at a timing when a predetermined period has elapsed from a current time, based on the preview reference data provided by the storage device. The vehicle is configured to execute, at a timing when the wheel passes through the predicted passing position, preview damping control for controlling the control force generating device to cause the control force generated by the control force generating device to agree with a target control force for damping the sprung portion. The target control force is calculated based on the preview condition amount.

As described above, the preview damping control is executed by using the target control force calculated based on the unsprung condition amount. Thus, the damping performance for the sprung portion can be improved as compared to the preview damping control using the target control force calculated based on the road surface displacement. Further, the unsprung condition amount contained in the preview reference data has a lower possibility of including a deviation than that of the road surface displacement in the device of the above document. According to the second aspect, the damping performance of the preview damping control can be improved such that the sprung portion can be damped appropriately.

A third aspect of the present disclosure relates to a damping control method for controlling a control force generating device to change a vertical control force for damping a sprung portion of a vehicle. The control force generating device is configured to generate the control force between at least one wheel and a portion of a vehicle body that corresponds to a position of the wheel. The damping control method includes acquiring, by the vehicle, as a preview condition amount, an unsprung condition amount at a predicted passing position where the wheel is predicted to pass at a timing when a predetermined period has elapsed from a current time, based on preview reference data being sets of data in which unsprung condition amounts and pieces of positional information are linked to each other. The unsprung condition amounts indicate a displacement condition of an unsprung portion actually displaced in a vertical direction due to a displacement of a road surface that is acquired when at least one of the vehicle and another vehicle has actually traveled on the road surface. The pieces of positional information are available to determine a position of the wheel when the unsprung condition amount is acquired. The damping control method includes controlling, by the vehicle, at a timing when the wheel passes through the predicted passing position, the control force generating device to cause the control force generated by the control force generating device to agree with a target control force for damping the sprung portion. The target control force is calculated based on the acquired preview condition amount.

As described above, the preview damping control is executed by using the target control force calculated based on the unsprung condition amount. Thus, the damping performance for the sprung portion can be improved as compared to the preview damping control using the target control force calculated based on the road surface displacement. Further, the unsprung condition amount contained in the preview reference data has a lower possibility of including a deviation than that of the road surface displacement in the device of the above document. According to the third aspect, the damping performance of the preview damping control can be improved such that the sprung portion can be damped appropriately.

A fourth aspect of the present disclosure relates to a data providing device including a controller. The controller is configured to provide preview reference data necessary for a vehicle to execute preview damping control to the vehicle configured to execute the preview damping control. The preview damping control involves controlling a control force generating device to change a vertical control force for damping a sprung portion. The control force generating device is configured to generate the control force between at least one wheel and a portion of a vehicle body that corresponds to a position of the wheel. The preview reference data are sets of data in which unsprung condition amounts and pieces of positional information are linked to each other. The unsprung condition amounts indicate a displacement condition of an unsprung portion actually displaced in a vertical direction due to a displacement of a road surface that is acquired when at least one of the vehicle and another vehicle has actually traveled on the road surface. The pieces of positional information are available to determine a position of the wheel when the unsprung condition amount is acquired. The vehicle is configured to acquire, as a preview condition amount, an unsprung condition amount at a predicted passing position where the wheel is predicted to pass at a timing when a predetermined period has elapsed from a current time, based on the preview reference data provided from the data providing device. The vehicle is configured to execute, at a timing when the wheel passes through the predicted passing position, the preview damping control for controlling the control force generating device to cause the control force generated by the control force generating device to agree with a target control force being a target value of the control force that is calculated based on the preview condition amount.

According to the fourth aspect, the preview reference data necessary for the vehicle to execute the preview damping control by using the target control force calculated based on the unsprung condition amount can be provided to the vehicle. Thus, the vehicle can improve the damping performance of the preview damping control such that the sprung portion can be damped appropriately.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Structure

Figure 2:
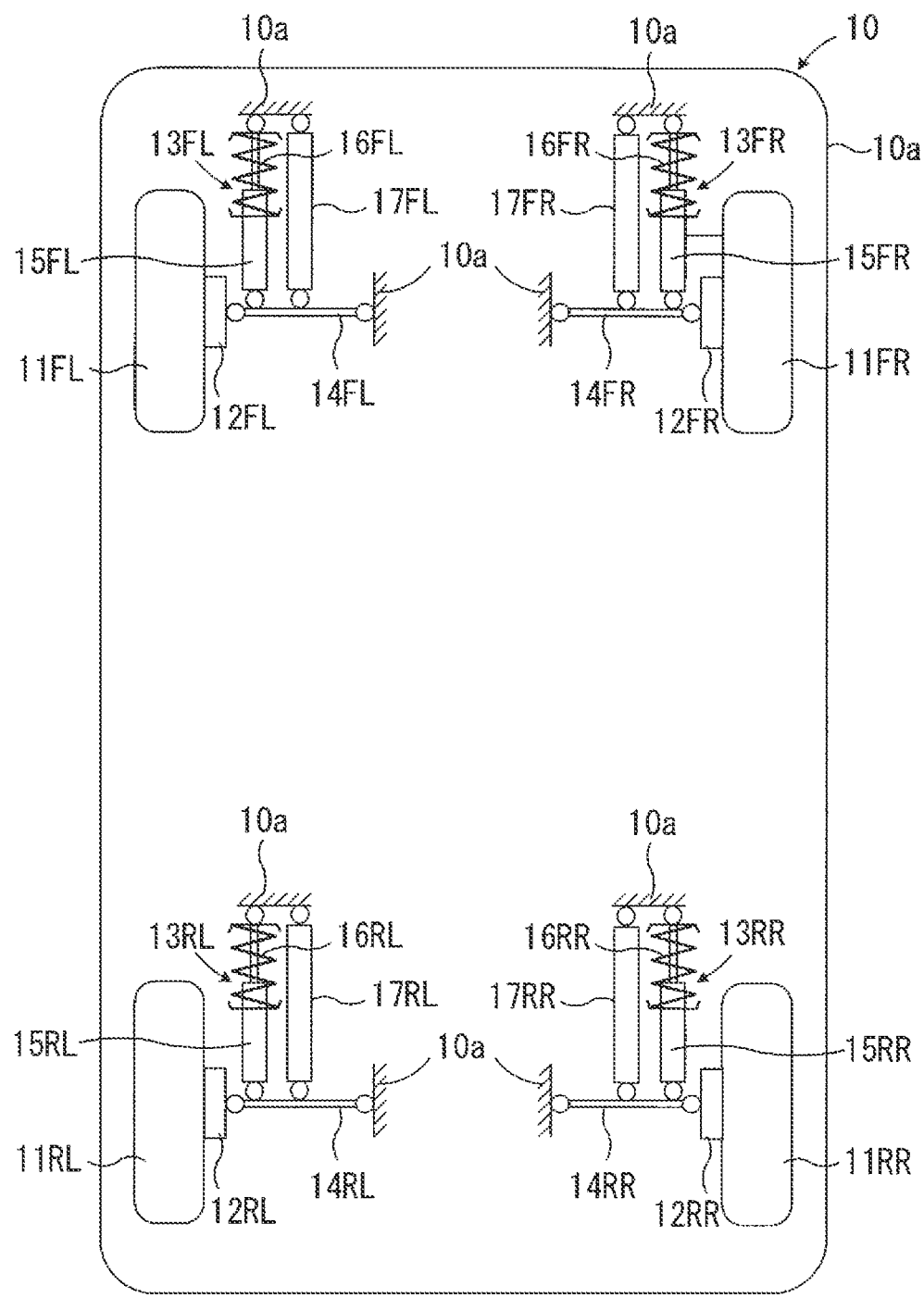
FIG. 2 is a schematic structural diagram of a vehicle to which a preview damping control device according to an embodiment of the present disclosure is applied.
Figure 3:
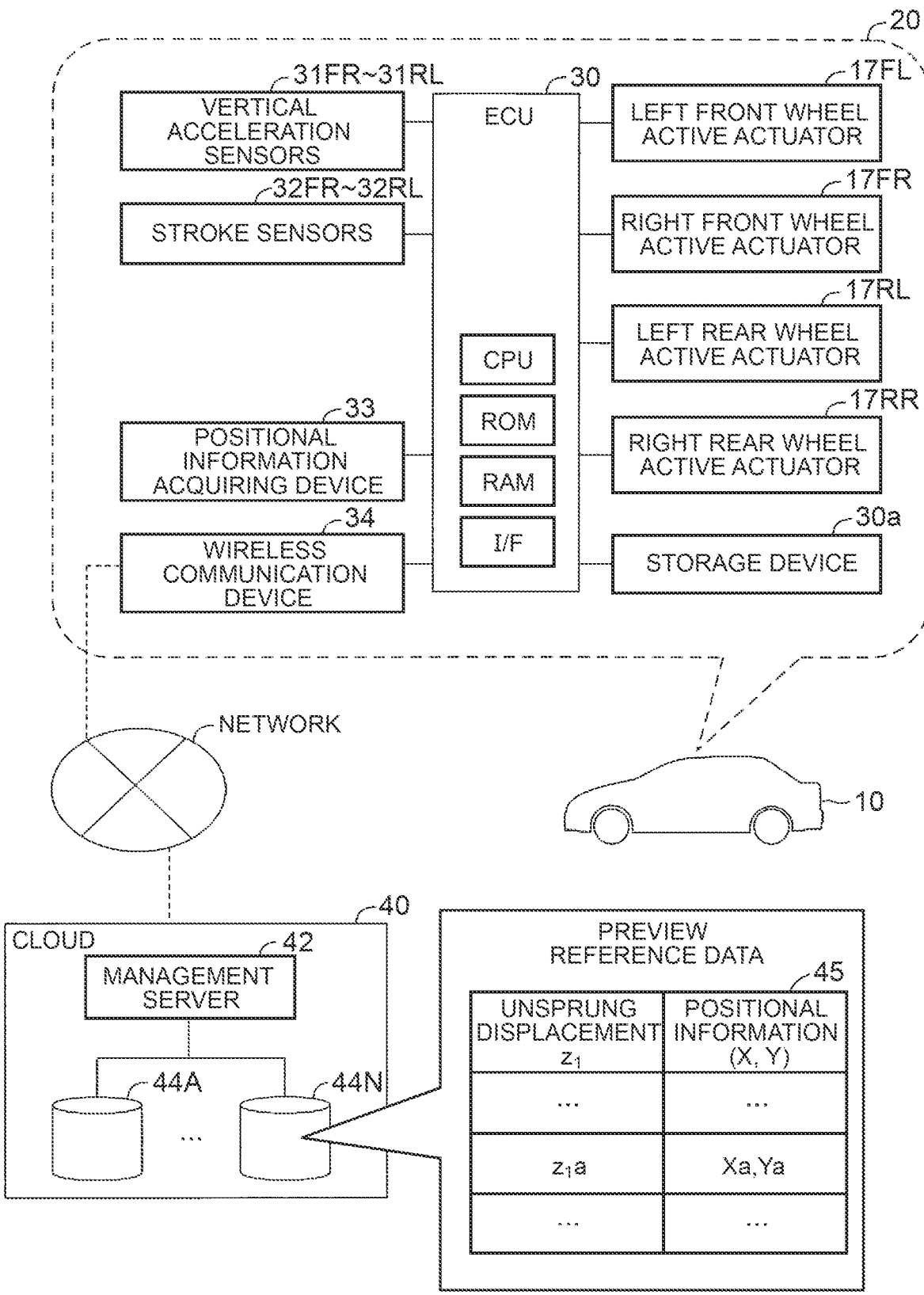
FIG. 3 is a schematic structural diagram of the preview damping control device according to the embodiment of the present disclosure.

A damping control device for a vehicle according to an embodiment of the present disclosure is applied to a vehicle 10 illustrated in FIG. 2. As illustrated in FIG. 3, the damping control device is hereinafter referred to also as "damping control device 20".

As illustrated in FIG. 2, the vehicle 10 includes a right front wheel 11FR, a left front wheel 11FL, a right rear wheel 11RR, and a left rear wheel 11RL. The right front wheel 11FR is rotatably supported on a vehicle body 10*a* by a wheel support member 12FR. The left front wheel 11FL is rotatably supported on the vehicle body 10*a* by a wheel support member 12FL. The right rear wheel 11RR is rotatably supported on the vehicle body 10*a* by a wheel support member 12RR. The left rear wheel 11RL is rotatably supported on the vehicle body 10*a* by a wheel support member 12RL.

The right front wheel 11FR, the left front wheel 11FL, the right rear wheel 11RR, and the left rear wheel 11RL are referred to as "wheels 11" unless otherwise distinguished. Similarly, the right front wheel 11FR and the left front wheel 11FL are referred to as "front wheels 11F". Similarly, the right rear wheel 11RR and the left rear wheel 11RL are referred to as "rear wheels 11R". The wheel support members 12FR to 12RL are referred to as "wheel support members 12".

The vehicle 10 further includes a right front wheel suspension 13FR, a left front wheel suspension 13FL, a right rear wheel suspension 13RR, and a left rear wheel suspension 13RL. Details of the suspensions 13FR to 13RL are described below. The suspensions 13FR to 13RL are independent suspensions, but other types of suspension may be employed.

The right front wheel suspension 13FR suspends the right front wheel 11FR from the vehicle body 10a, and includes a suspension arm 14FR, a shock absorber 15FR, and a suspension spring 16FR. The left front wheel suspension 13FL suspends the left front wheel 11FL from the vehicle body 10a, and includes a suspension arm 14FL, a shock absorber 15FL, and a suspension spring 16FL.

The right rear wheel suspension 13RR suspends the right rear wheel 11RR from the vehicle body 10a, and includes a suspension arm 14RR, a shock absorber 15RR, and a suspension spring 16RR. The left rear wheel suspension 13RL suspends the left rear wheel 11RL from the vehicle body 10a, and includes a suspension arm 14RL, a shock absorber 15RL, and a suspension spring 16RL.

The right front wheel suspension 13FR, the left front wheel suspension 13FL, the right rear wheel suspension 13RR, and the left rear wheel suspension 13RL are referred to as "suspensions 13" unless otherwise distinguished. Similarly, the suspension arms 14FR to 14RL are referred to as "suspension arms 14". Similarly, the shock absorbers 15FR to 15RL are referred to as "shock absorbers 15". Similarly, the suspension springs 16FR to 16RL are referred to as "suspension springs 16".

The suspension arm 14 couples the wheel support member 12 to the vehicle body 10a. In FIG. 2, one suspension arm 14 is illustrated for one suspension 13, but a plurality of suspension arms 14 may be provided for one suspension 13.

The shock absorber 15 is arranged between the vehicle body 10a and the suspension arm 14, coupled to the vehicle body 10a at the upper end, and coupled to the suspension arm 14 at the lower end. The suspension spring 16 is resiliently mounted between the vehicle body 10a and the suspension arm 14 via the shock absorber 15. That is, the upper end of the suspension spring 16 is coupled to the vehicle body 10a, and the lower end of the suspension spring 16 is coupled to a cylinder of the shock absorber 15. In this resilient mounting structure of the suspension spring 16, the shock absorber 15 may be arranged between the vehicle body 10a and the wheel support member 12.

In this example, the shock absorber 15 is a non-adjustable shock absorber, but may be an adjustable shock absorber. The suspension spring 16 may resiliently be mounted between the vehicle body 10a and the suspension arm 14 without intervention of the shock absorber 15. That is, the upper end of the suspension spring 16 may be coupled to the vehicle body 10a, and the lower end of the suspension spring 16 may be coupled to the suspension arm 14. In this resilient mounting structure of the suspension spring 16, the shock absorber 15 and the suspension spring 16 may be arranged between the vehicle body 10a and the wheel support member 12.

Regarding the members such as the wheel 11 and the shock absorber 15 of the vehicle 10, a portion close to the wheel 11 with respect to the suspension spring 16 is referred to as "unsprung portion 50 or unsprung member 50 (see FIG. 1)". Regarding the members such as the vehicle body 10a and the shock absorber 15 of the vehicle 10, a portion close to the vehicle body 10a with respect to the suspension spring 16 is referred to as "sprung portion 51 or sprung member 51 (see FIG. 1)".

A right front wheel active actuator 17FR, a left front wheel active actuator 17FL, a right rear wheel active actuator 17RR, and a left rear wheel active actuator 17RL are provided between the vehicle body 10a and the suspension arms 14FR to 14RL, respectively. The active actuators 17FR to 17RL are provided in parallel to the shock absorbers 15FR to 15RL and the suspension springs 16FR to 16RL, respectively.

The right front wheel active actuator 17FR, the left front wheel active actuator 17FL, the right rear wheel active actuator 17RR, and the left rear wheel active actuator 17RL are referred to as "active actuators 17" unless otherwise distinguished. Similarly, the right front wheel active actuator 17FR and the left front wheel active actuator 17FL are referred to as "front wheel active actuators 17F". Similarly, the right rear wheel active actuator 17RR and the left rear wheel active actuator 17RL are referred to as "rear wheel active actuators 17R".

The active actuator 17 generates control force Fc based on a control command from an electronic control unit 30 illustrated in FIG. 3. The control force Fc is a vertical force acting between the vehicle body 10a and the wheel 11 (that is, between the sprung portion 51 and the unsprung portion 50) to damp the sprung portion 51. The electronic control unit 30 is referred to as "ECU 30", and may be referred to as "control unit 30 or controller 30". The active actuator 17 may be referred to as "control force generating device 17". The active actuator 17 is an electromagnetic active suspension. The active actuator 17 serves as the active suspension in cooperation with, for example, the shock absorber 15 and the suspension spring 16.

As illustrated in FIG. 3, the damping control device 20 includes a storage device 30a, vertical acceleration sensors 31FR to 31RL, stroke sensors 32FR to 32RL, a positional information acquiring device 33, and a wireless communication device 34 in addition to the ECU 30. The damping control device 20 further includes the active actuators 17FR to 17RL.

The ECU 30 includes a microcomputer. The microcomputer includes a CPU, a read-only memory (ROM), a random-access memory (RAM), and an interface (I/F). The CPU executes instructions (programs or routines) stored in the ROM to implement various functions.

The ECU 30 is connected to the non-volatile storage device 30a in which information is readable and writable. In this example, the storage device 30a is a hard disk drive. The ECU 30 can store (save) information in the storage device 30a, and can read information stored (saved) in the storage device 30a. The storage device 30a is not limited to the hard disk drive, and may be any storage device or storage medium in which information is readable and writable.

The ECU 30 is connected to the vertical acceleration sensors 31FR to 31RL and the stroke sensors 32FR to 32RL, and receives signals output from those sensors.

The vertical acceleration sensors 31FR to 31RL detect vertical accelerations (sprung accelerations $ddz_2FR$ to $ddz_2RL$) of the vehicle body 10a (sprung portion 51) relative to the positions of the wheels 11FR to 11RL, and output signals indicating the vertical accelerations, respectively. The vertical acceleration sensors 31FR to 31RL are referred to as "vertical acceleration sensors 31" unless otherwise distinguished. Similarly, the sprung accelerations $ddz_2FR$ to $ddz_2RL$ are referred to as "sprung accelerations $ddz_2$".

The stroke sensors 32FR to 32RL are provided to the right front wheel suspension 13FR, the left front wheel suspension 13FL, the right rear wheel suspension 13RR, and the left rear wheel suspension 13RL, respectively. The stroke sensors 32FR to 32RL detect vertical strokes Hfr to Hrl of the suspensions 13FR to 13RL, and output signals indicating the vertical strokes, respectively. The strokes Hfr to Hrl are vertical strokes between the wheel support members 12FR to 12RL and parts of the vehicle body 10a (sprung portion 51) corresponding to the positions of the wheels 11 illustrated in FIG. 2, respectively. The stroke sensors 32FR to 32RL are referred to as "stroke sensors 32" unless otherwise distinguished. Similarly, the strokes Hfr to Hrl are referred to as "strokes H".

The ECU 30 is connected to the positional information acquiring device 33 and the wireless communication device 34.

The positional information acquiring device 33 includes a global navigation satellite system (GNSS) receiver and a map database. The GNSS receiver receives "signal from artificial satellite (for example, GNSS signal)" for detecting a position of the vehicle 10 at a current time (current position). The map database stores road map information and the like. The positional information acquiring device 33 acquires the current position (for example, latitude and longitude) of the vehicle 10 based on the GNSS signal. Examples of the positional information acquiring device 33 include a navigation device.

The ECU 30 acquires "vehicle speed V1 of vehicle 10 and traveling direction Td of vehicle 10" at a current time based on records of current positions acquired by the positional information acquiring device 33.

The wireless communication device 34 is a wireless communication terminal for communicating information with a cloud 40 via a network. The cloud 40 includes "management server 42 and a plurality of storage devices 44A to 44N" connected to the network. The one or more storage devices 44A to 44N are referred to as "storage devices 44" unless otherwise distinguished.

The management server 42 includes a CPU, a ROM, a RAM, and an interface (I/F). The management server 42 retrieves and reads data stored in the storage device 44, and writes data into the storage device 44.

The storage device 44 stores preview reference data 45. An unsprung displacement $z_1$ and positional information acquired when the vehicle 10 has actually traveled on a road surface are registered in the preview reference data 45 while being linked to (associated with) each other. In other words, the vehicle 10 transmits a position of the wheel 11 of the traveling vehicle 10 and an actual value of the unsprung displacement $z_1$ at this position of the wheel 11 (a method for acquiring the actual value is described later) to the management server 42 in association with each other, and the management server 42 stores the position and the actual value in the storage device 44 as the preview reference data 45.

The unsprung portion 50 is displaced in a vertical direction in response to a displacement of a road surface when the vehicle 10 travels on the road surface. The unsprung displacement $z_1$ is the vertical displacement of the unsprung portion 50 corresponding to the position of each wheel 11 of the vehicle 10. The positional information is "information indicating position (for example, latitude and longitude) of wheel 11 where unsprung displacement $z_1$ is acquired" at a time when the unsprung displacement $z_1$ is acquired. The position of the wheel 11 is calculated based on a position of the vehicle 10. FIG. 3 illustrates an unsprung displacement "$z_1$a" and positional information "Xa, Ya" as examples of "unsprung displacement $z_1$ and positional information" registered as the preview reference data 45.

The ECU 30 is connected to the right front wheel active actuator 17FR, the left front wheel active actuator 17FL, the right rear wheel active actuator 17RR, and the left rear wheel active actuator 17RL via drive circuits (not illustrated).

The ECU 30 calculates a target control force Fct for damping the sprung portion 51 based on an unsprung displacement $z_1$ at a predicted passing position of each wheel 11 described later, and controls the active actuator 17 to generate control force Fc that corresponds to (agrees with) the target control force Fct when each wheel 11 passes through the predicted passing position.

Overview of Basic Preview Damping Control

Figure 1:
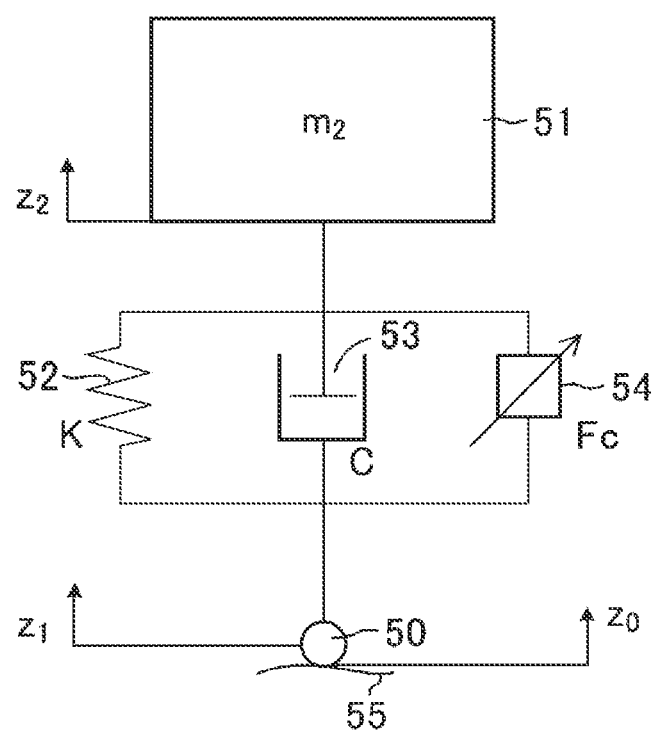
FIG. 1 is a diagram illustrating a single-wheel model of a vehicle.

An overview of basic preview damping control to be executed by the damping control device 20 is described below with reference to FIG. 1.

A spring 52 corresponds to the suspension spring 16. A damper 53 corresponds to the shock absorber 15. An actuator 54 corresponds to the active actuator 17. A damping coefficient C of the shock absorber 15 is assumed to be constant, but an actual damping coefficient changes depending on a stroke speed of the suspension 13. Therefore, the damping coefficient C may be set to, for example, a value that changes depending on a time derivative of the stroke H.

When vibration of the sprung portion 51 is completely canceled out by the control force Fc in Expression (1) (that is, when a sprung acceleration $ddz_2$, a sprung speed $dz_2$, and a sprung displacement $z_2$ are "0"), the control force Fc is represented by Expression (7).

$$Fc = Cdz_1 + Kz_1 \qquad (7)$$

Vibration of the sprung displacement $z_2$ when the control force Fc is represented by Expression (5) is discussed. When Expression (5) is applied to Expression (1), Expression (1) can be represented by Expression (8).

$$m_2 ddz_2 = C(dz_1 - dz_2) + K(z_1 - z_2) - \alpha(Cdz_1 + Kz_1) \qquad (8)$$

When Expression (8) is subjected to Laplace transform and rearranged, Expression (9) is obtained. That is, a transfer function from the unsprung displacement $z_1$ to the sprung displacement $z_2$ is represented by Expression (9). In Expression (9), "s" represents a Laplace operator.

$$\frac{z_2}{z_1} = \frac{(1-\alpha)(Cs+K)}{m_2 s^2 + Cs + K} \qquad (9)$$

According to Expression (9), the transfer function changes depending on α. When α is an arbitrary value larger than 0 and equal to or smaller than 1, it is observed that the magnitude of the transfer function is securely smaller than "1" (that is, the vibration of the sprung portion 51 can be reduced). When α is 1, the magnitude of the transfer function is "0". Therefore, it is observed that the vibration of the sprung portion 51 is completely canceled out. The target control force Fct can be represented by Expression (10) based on Expression (5). In Expression (10), a gain $\beta_1$ corresponds to αC, and a gain $\beta_2$ corresponds to αK.

$$Fct = \beta_1 \times dz_1 + \beta_2 \times z_1 \qquad (10)$$

Thus, the ECU 30 calculates the target control force Fct by acquiring in advance (previewing) an unsprung displacement $z_1$ at a position where the wheel 11 passes in the future (predicted passing position), and applying the acquired unsprung displacement $z_1$ to Expression (10). The ECU 30 causes the actuator 54 to generate control force Fc corresponding to the target control force Fct at a timing when the wheel 11 passes through the predicted passing position (that is, at a timing when the unsprung displacement $z_1$ applied to Expression (10) occurs). With this configuration, the vibration of the sprung portion 51 can be reduced when the wheel 11 passes through the predicted passing position (that is, when the unsprung displacement $z_1$ applied to Expression (10) occurs).

The target control force Fct may be calculated based on Expression (11) obtained by omitting the derivative term ($\beta_1 \times dz_1$) from Expression (10). Also in this case, the control force Fc ($=\beta_2 \times z_1$) for reducing the vibration of the sprung portion 51 is generated from the actuator 54. Therefore, the vibration of the sprung portion 51 can be reduced as compared to a case where the control force Fc is not generated.

$$Fct = \beta_2 \times z_1 \qquad (11)$$

The control described above is damping control for the sprung portion 51, which is referred to as "preview damping control".

Overview of Operations

An overview of operations of the damping control device 20 is described below. As described above, unsprung displacements $z_1$ and pieces of positional information are registered in the preview reference data 45 while being linked to each other. The damping control device 20 acquires an unsprung displacement $z_1$ at a predicted passing position based on the preview reference data 45 and information related to a position of the vehicle 10 that is acquired from the positional information acquiring device 33, and calculates a target control force Fct based on the unsprung displacement $z_1$. The damping control device 20 controls the active actuator 17 to output control force Fc corresponding to the target control force Fct at a timing when the wheel 11 passes through the predicted passing position.

Since the preview damping control is executed by using the target control force Fct calculated based on the unsprung displacement $z_1$, the vibration of the sprung portion 51 can be reduced appropriately and the damping performance of the preview damping control can be improved as compared to preview damping control to be executed by using a target control force Fct calculated based on a road surface displacement $z_0$.

In this embodiment, the unsprung displacements $z_1$ and the pieces of positional information are registered in the preview reference data 45 while being linked to each other. The unsprung displacements $z_1$ are values indicating displacements of the unsprung portions 50 displaced in the vertical direction due to a displacement of a road surface 55 when the vehicle 10 and other vehicles have actually traveled on the road surface 55. An actual value of the unsprung displacement $z_1$ is acquired based on a motion condition amount indicating a vertical motion of the sprung portion 51 or the unsprung portion 50. For example, the actual value of the unsprung displacement $z_1$ is acquired by subtracting "stroke H ($=z_2-z_1$) acquired by stroke sensor 32" from a value obtained through second-order integral of the sprung acceleration $ddz_2$ acquired by the vertical acceleration sensor 31.

The actual value of the unsprung displacement $z_1$ has a lower possibility of including a deviation than that of the road surface displacement $z_0$ calculated based on sensing data acquired by a preview sensor such as a camera sensor, a LIDAR sensor, a radar, and "plane or three-dimensional scanning sensor" as in the related-art device. Since the preview damping control is performed based on the unsprung displacement $z_1$ in this embodiment, the damping performance of the preview damping control can be improved.

Depending on an external environment, the preview sensor may fail to acquire the sensing data from which the road surface displacement $z_0$ can be acquired. For example, there is a strong possibility that the road surface displacement $z_0$ cannot be acquired from sensing data acquired by the preview sensor (in particular, the camera sensor) under a dark condition. Further, the calculation process for the unsprung displacement $z_1$ is simpler than the process for acquiring the road surface displacement $z_0$ from the sensing data. Therefore, a load on the calculation process for the unsprung displacement $z_1$ is lighter than a load on the process for acquiring the road surface displacement $z_0$. In addition, the preview sensor is expensive. In this embodiment, the unsprung displacement $z_1$ is acquired without using the preview sensor. Thus, the unsprung displacement $z_1$ can be collected with a lighter processing load and at a lower cost irrespective of the external environment.

Operation Example

Figure 4:
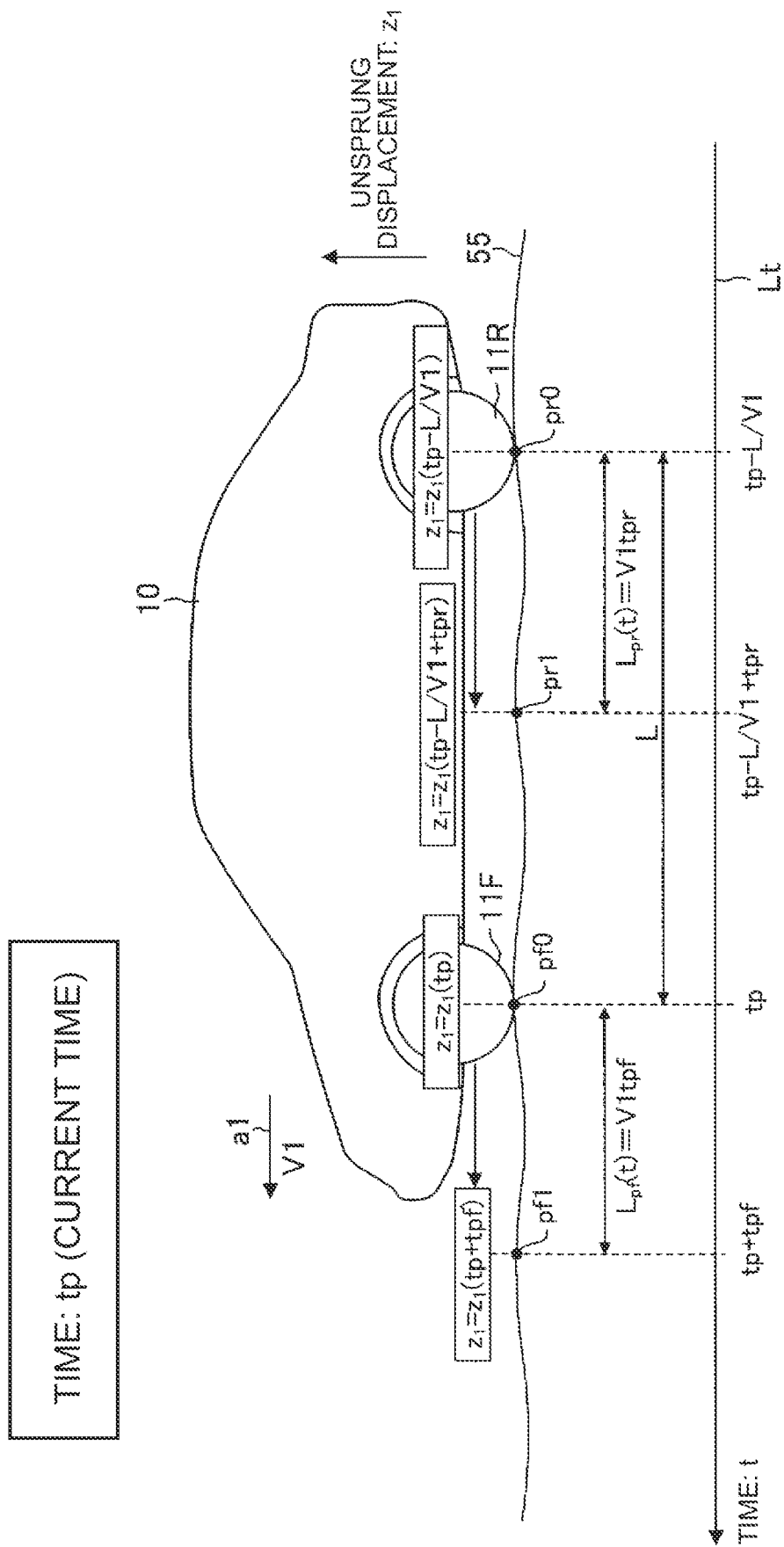
FIG. 4 is a diagram for describing preview damping control.

An example of the operation of the damping control device 20 is described below with reference to FIG. 4 to FIG. 6. FIG. 4 illustrates the vehicle 10 traveling at a vehicle speed V1 in a direction indicated by an arrow a1 at a current time tp. In the following description, the front wheel 11F and the rear wheel 11R are right or left wheels, and the moving speeds of the front wheel 11F and the rear wheel 11R are equal to the vehicle speed V1.

In FIG. 4, a line Lt is a virtual time axis t. Unsprung displacements $z_1$ of the front wheel 11F on a movement path at current, past, and future times t are represented by a function $z_1(t)$ of the times t. Thus, an unsprung displacement $z_1$ of the front wheel 11F at a position (contact point) pf0 at the current time tp is represented by $z_1(tp)$. An unsprung displacement $z_1$ of the rear wheel 11R at a position pr0 at the current time tp corresponds to an unsprung displacement $z_1$ of the front wheel 11F at a time "tp−L/V1" earlier than the current time tp by "period (L/V1) required for front wheel 11F to move by wheelbase L". Thus, the unsprung displacement $z_1$ of the rear wheel 11R at the current time tp is represented by $z_1(tp-L/V1)$.

First, preview damping control for the front wheel 11F is described. The ECU 30 determines a predicted passing position pf1 of the front wheel 11F at a time later (in the future) than the current time tp by a front wheel preview period tpf. The front wheel preview period tpf is preset to a period required from the timing when the ECU 30 determines the predicted passing position pf1 to the timing when the front wheel active actuator 17F outputs control force Fcf corresponding to a target control force Fcft.

The predicted passing position pf1 of the front wheel 11F is a position spaced away from the position pf0 at the current time tp by a front wheel preview distance Lpf ($=V1 \times tpf$) along a front wheel predicted movement path where the front wheel 11F is predicted to move. As described later in detail, the position pf0 is calculated based on a current position of the vehicle 10 that is acquired by the positional information acquiring device 33.

The ECU 30 acquires in advance a part of the preview reference data 45 in an area near the current position of the vehicle 10 (preparatory zone described later) from the cloud 40. The ECU 30 acquires an unsprung displacement $z_1(tp+tpf)$ based on the determined predicted passing position pf1 and the part of the preview reference data 45 acquired in advance. The ECU 30 may acquire the unsprung displacement $z_1$(tp+tpf) as follows. First, the ECU 30 transmits the determined predicted passing position pf1 to the cloud 40. The cloud 40 acquires the unsprung displacement $z_1$(tp+tpf) linked to positional information indicating the predicted passing position pf1 based on the predicted passing position pf1 and the preview reference data 45. The cloud 40 transmits the unsprung displacement $z_1$(tp+tpf) to the ECU 30.

The ECU 30 calculates a target control force Fcft (=βf× $z_1$(tp+tpf)) by applying the unsprung displacement $z_1$(tp+tpf) to the unsprung displacement $z_1$ in Expression (12).

$$Fcft = \beta f \times z_1 \qquad (12)$$

The ECU 30 transmits a control command containing the target control force Fcft to the front wheel active actuator 17F to cause the front wheel active actuator 17F to generate control force Fcf that corresponds to (agrees with) the target control force Fcft.

Figure 5:
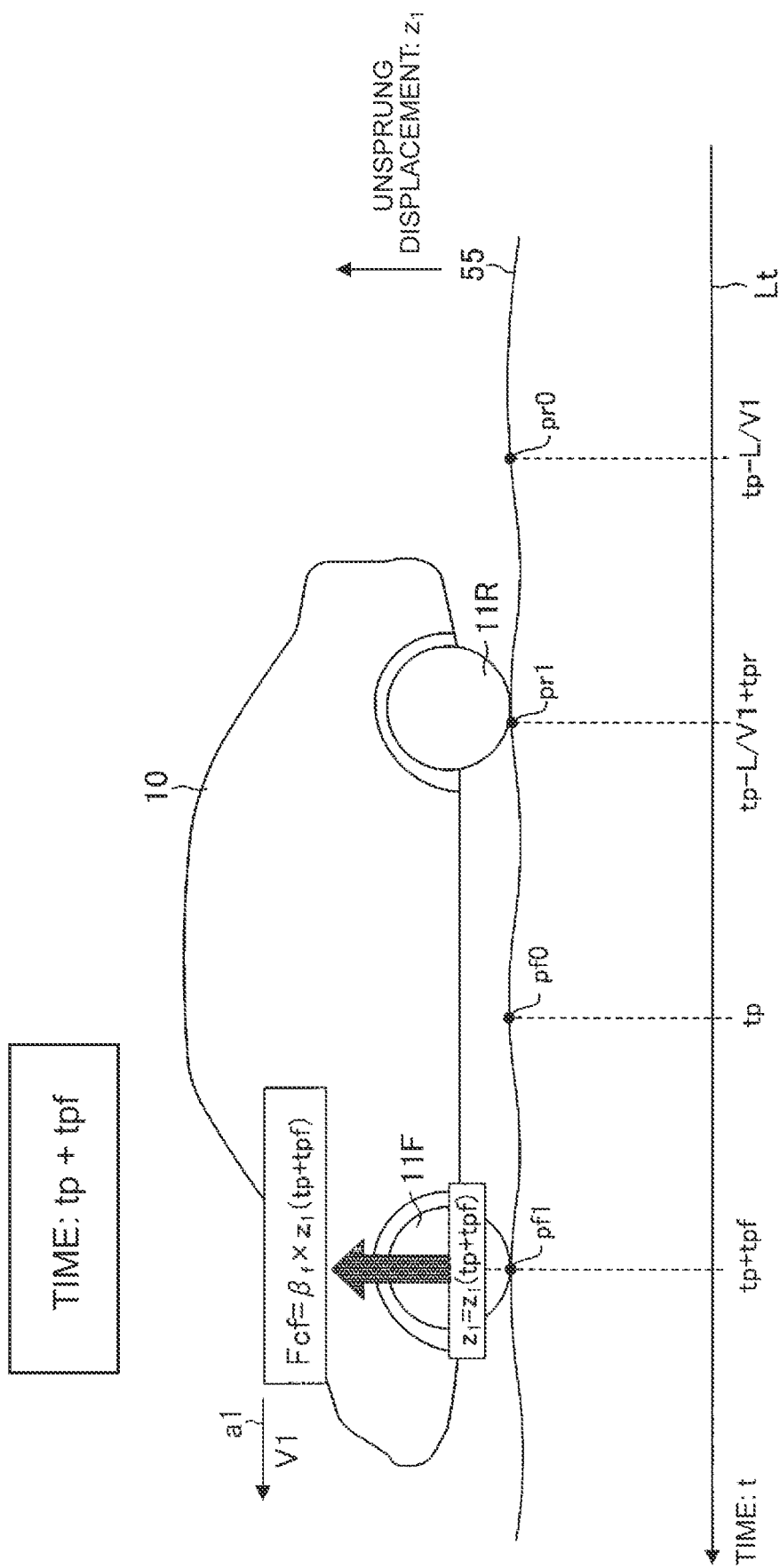
FIG. 5 is a diagram for describing the preview damping control.

As illustrated in FIG. 5, the front wheel active actuator 17F generates the control force Fcf corresponding to the target control force Fcft at "time tp+tpf" (that is, at a timing when the front wheel 11F actually passes through the predicted passing position pf1) later than the current time tp by the front wheel preview period tpf. Thus, the front wheel active actuator 17F can generate, at an appropriate timing, the control force Fcf for appropriately reducing the vibration of the sprung portion 51 that occurs due to the unsprung displacement $z_1$ of the front wheel 11F at the predicted passing position pf1.

Next, preview damping control for the rear wheel 11R is described. The ECU 30 determines a predicted passing position pr1 of the rear wheel 11R at a time later (in the future) than the current time tp by a rear wheel preview period tpr. The rear wheel preview period tpr is preset to a period required from the timing when the ECU 30 determines the predicted passing position pr1 to the timing when the rear wheel active actuator 17R outputs control force Fcr corresponding to a target control force Fcrt. If the front wheel active actuator 17F and the rear wheel active actuator 17R are different, the front wheel preview period tpf and the rear wheel preview period tpr are preset to different values. If the front wheel active actuator 17F and the rear wheel active actuator 17R are the same, the front wheel preview period tpf and the rear wheel preview period tpr are preset to the same value.

The ECU 30 determines, as the predicted passing position pr1, a position spaced away from the position pr0 at the current time tp by a rear wheel preview distance Lpr (=V1×tpr) along a predicted movement path of the rear wheel 11R under the assumption that the rear wheel 11R moves along the same path as that of the front wheel 11F. As described later in detail, the position pr0 is calculated based on the current position of the vehicle 10 that is acquired by the positional information acquiring device 33. An unsprung displacement $z_1$ at the predicted passing position pr1 can be represented by $z_1$(tp−L/V1+tpr) because this unsprung displacement $z_1$ occurs at a time later than "time (tp−L/V1) when front wheel 11F was located at position pr0 of rear wheel 11R at current time" by the rear wheel preview period tpr. The ECU 30 acquires the unsprung displacement $z_1$(tp−L/V1+tpr) based on the determined predicted passing position pr1 and the part of the preview reference data 45 acquired in advance. The ECU 30 may acquire the unsprung displacement $z_1$(tp−L/V1+tpr) as follows. First, the ECU 30 transmits the determined predicted passing position pr1 to the cloud 40. The cloud 40 acquires the unsprung displacement $z_1$(tp−L/V1+tpr) linked to positional information indicating the predicted passing position pr1 based on the predicted passing position pr1 and the preview reference data 45. The cloud 40 transmits the unsprung displacement $z_1$(tp−L/V1+tpr) to the ECU 30.

The ECU 30 calculates a target control force Fcrt (=βr× $z_1$(tp−L/V1+tpr)) by applying the unsprung displacement $z_1$(tp−L/V1+tpr) to the unsprung displacement $z_1$ in Expression (13). The gain βf in Expression (12) and the gain βr in Expression (13) are set to different values. This is because a spring rate Kf of the right front wheel suspension 13FR and the left front wheel suspension 13FL differs from a spring rate Kr of the right rear wheel suspension 13RR and the left rear wheel suspension 13RL.

$$Fcrt = \beta r \times z_1 \qquad (13)$$

The ECU 30 transmits a control command containing the target control force Fcrt to the rear wheel active actuator 17R to cause the rear wheel active actuator 17R to generate control force Fcr that corresponds to (agrees with) the target control force Fcrt.

Figure 6:
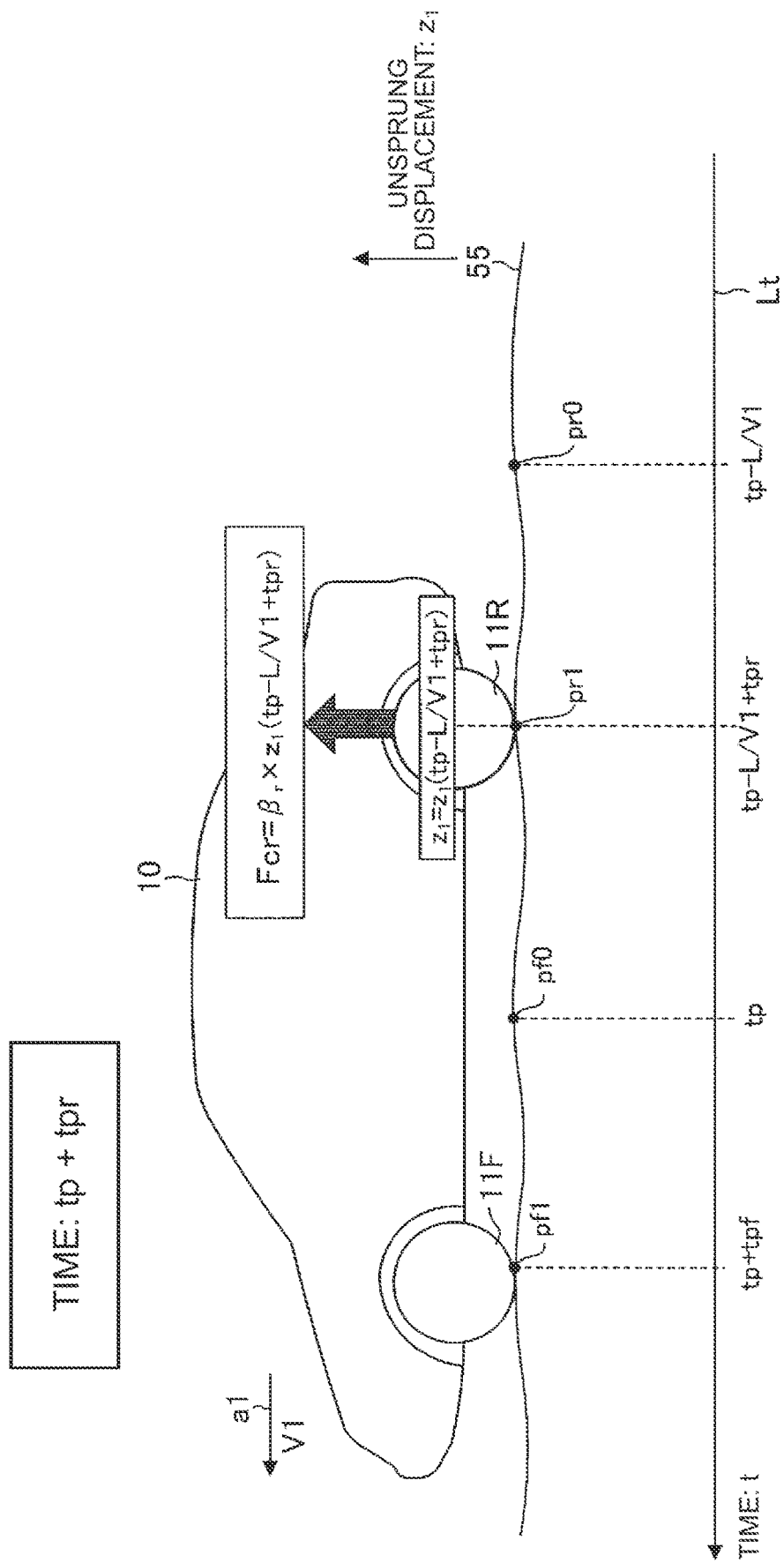
FIG. 6 is a diagram for describing the preview damping control.

As illustrated in FIG. 6, the rear wheel active actuator 17R generates the control force Fcr corresponding to the target control force Fcrt at "time tp+tpr" (that is, at a timing when the rear wheel 11R actually passes through the predicted passing position pr1) later than the current time tp by the rear wheel preview period tpr. Thus, the rear wheel active actuator 17R can generate, at an appropriate timing, the control force Fcr for appropriately reducing the vibration of the sprung portion 51 that occurs due to the unsprung displacement $z_1$ of the rear wheel 11R at the predicted passing position pr1.

Specific Operations

Preview Damping Control Routine

The CPU of the ECU 30 ("CPU" hereinafter refers to the CPU of the ECU 30 unless otherwise noted) executes a preview damping control routine illustrated in a flowchart of FIG. 7 every time a predetermined period has elapsed.

Figure 7:
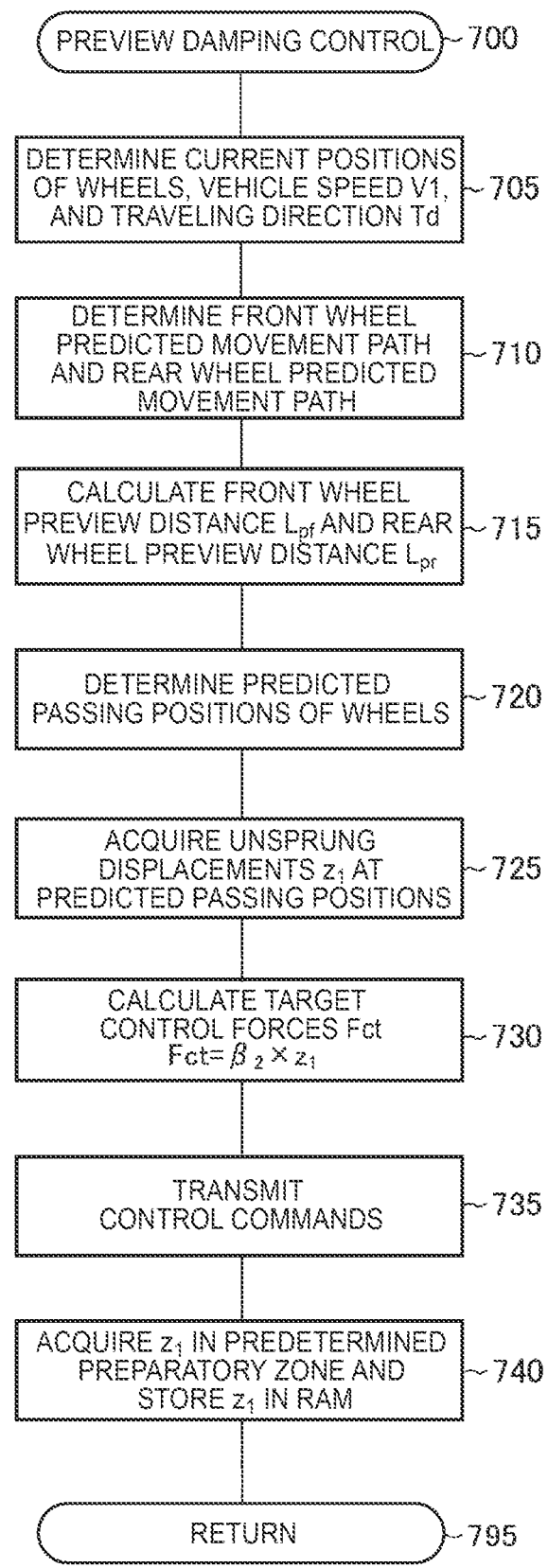
FIG. 7 is a flowchart illustrating a routine to be executed by a central processing unit (CPU) of an electronic control unit.

At a predetermined timing, the CPU starts a process from Step 700 of FIG. 7, and executes Step 705 to Step 740 in this order. Then, the CPU proceeds to Step 795 to temporarily terminate this routine.

Step 705: The CPU acquires information related to a current position of the vehicle 10 from the positional information acquiring device 33, and determines (acquires) current positions of the wheels 11, a vehicle speed V1, and a traveling direction Td of the vehicle 10.

More specifically, the CPU maps a current position in a previous case and a current position in a present case on the road map information contained in the map database, and determines, as the traveling direction Td of the vehicle 10, a direction from the current position in the previous case to the current position in the present case. The current position in the previous case means a current position of the vehicle 10 that is acquired by the CPU in Step 705 of the previously executed routine. The current position in the present case means a current position of the vehicle 10 that is acquired by the CPU in Step 705 of the present routine.

The ROM of the ECU 30 prestores positional relationship data indicating relationships between a mounting position of the GNSS receiver in the vehicle 10 and the positions of the wheels 11. The current position of the vehicle 10 that is acquired from the positional information acquiring device 33 corresponds to the mounting position of the GNSS receiver. Therefore, the CPU determines the current positions of the wheels 11 by referring to the current position of the vehicle 10, the traveling direction Td of the vehicle 10, and the positional relationship data. The GNSS signal received by the positional information acquiring device 33 contains information related to a moving speed. The CPU determines the vehicle speed V1 based on the GNSS signal.

Step 710: The CPU determines a front wheel predicted movement path and a rear wheel predicted movement path as follows. The front wheel predicted movement path is a path where the front wheel 11F is predicted to move in the future. The rear wheel predicted movement path is a path where the rear wheel 11R is predicted to move in the future. For example, the CPU determines the front wheel predicted movement path and the rear wheel predicted movement path based on the current positions of the wheels 11, the traveling direction Td of the vehicle 10, and the positional relationship data.

Step 715: As described above, the CPU calculates a front wheel preview distance Lpf by multiplying the vehicle speed V1 by the front wheel preview period tpf, and calculates a rear wheel preview distance Lpr by multiplying the vehicle speed V1 by the rear wheel preview period tpr.

Step 720: The CPU determines a front wheel predicted passing position pf1 and a rear wheel predicted passing position pr1. More specifically, the CPU determines, as the front wheel predicted passing position pf1, a position to be reached by the front wheel 11F moving from its current position by the front wheel preview distance Lpf along the front wheel predicted movement path. The CPU determines, as the rear wheel predicted passing position pr1, a position to be reached by the rear wheel 11R moving from its current position by the rear wheel preview distance $Lp_r$ along the rear wheel predicted movement path.

Step 725: The CPU acquires an unsprung displacement $z_1$ at the front wheel predicted passing position pf1 and an unsprung displacement $z_1$ at the rear wheel predicted passing position pr1 from among "unsprung displacements $z_1$ in preparatory zone" described later, which are acquired in advance from the preview reference data 45 in the cloud 40. Each unsprung displacement $z_1$ acquired in Step 725 may be referred to as "preview condition amount".

Step 730: The CPU calculates target control forces Fct for the respective active actuators 17 by applying the unsprung displacement $z_1$ at the front wheel predicted passing position pf1 to Expression (12), and applying the unsprung displacement $z_1$ at the rear wheel predicted passing position pr1 to Expression (13).

Step 735: The CPU transmits control commands containing the target control forces Fct to the respective active actuators 17.

Step 740: When the front wheel predicted passing position pf1 reaches a position that is a predetermined distance back from the end point of the preparatory zone, the CPU acquires "unsprung displacements $z_1$ and pieces of positional information" in a new preparatory zone having a start point at the front wheel predicted passing position pf1 from the preview reference data 45 in the cloud 40, and stores the acquired unsprung displacements $z_1$ and the acquired pieces of positional information in the RAM. The new preparatory zone has a start point at the front wheel predicted passing position pf1 that reaches the end point of the previous preparatory zone, and has an end point at a position spaced away from the front wheel predicted passing position pf1 by a predetermined preparatory distance along the front wheel predicted movement path. The preparatory distance is preset to a value sufficiently larger than the front wheel preview distance Lpf.

The process of Step 740 is described in detail. The CPU transmits an acquisition request containing positional information of the preparatory zone to the management server 42 via the wireless communication device 34. The management server 42 acquires, from the preview reference data 45, unsprung displacements $z_1$ and pieces of positional information linked to the positional information of the preparatory zone that is contained in the acquisition request, and transmits the acquired unsprung displacements $z_1$ and the acquired pieces of positional information to the damping control device 20. When the damping control device 20 receives the unsprung displacements $z_1$ and the pieces of positional information, the CPU stores the received unsprung displacements $z_1$ and the received pieces of positional information in the RAM.

As understood from the above, the damping control device 20 performs the preview damping control based on the unsprung displacement $z_1$ contained in the preview reference data 45. The unsprung displacement $z_1$ has higher accuracy than the road surface displacement $z_0$ in terms of the actual displacement of the road surface 55. Thus, the damping control device 20 can improve the damping performance of the preview damping control.

Unsprung Displacement Collection Routine

Figure 8:
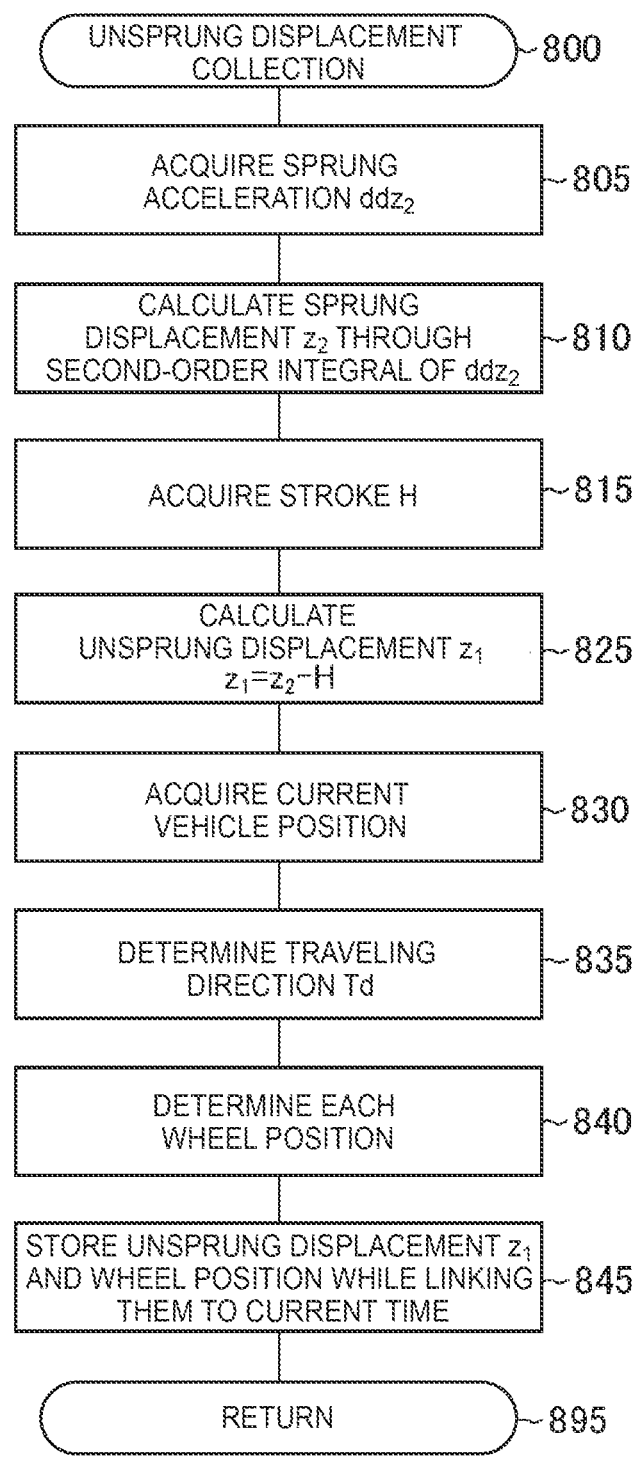
FIG. 8 is a flowchart illustrating a routine to be executed by the CPU of the electronic control unit.

The CPU of the ECU 30 executes an unsprung displacement collection routine illustrated in a flowchart of FIG. 8 every time a predetermined period has elapsed. This routine is executed for each wheel.

At a predetermined timing, the CPU starts a process from Step 800 of FIG. 8, and executes Step 805 to Step 845 in this order. Then, the CPU proceeds to Step 895 to temporarily terminate this routine.

Step 805: The CPU acquires a sprung acceleration $ddz_2$ from the vertical acceleration sensor 31.

Step 810: The CPU calculates a sprung displacement $z_2$ through second-order integral of the sprung acceleration $ddz_2$ acquired in Step 805.

Step 815: The CPU acquires a stroke H from the stroke sensor 32. The stroke H is a vertical suspension stroke at a position of the wheel 11, and corresponds to a value obtained by subtracting an unsprung displacement $z_1$ at the position of the wheel 11 from a sprung displacement $z_2$ at the position of the wheel 11.

Step 825: The CPU calculates an unsprung displacement $z_1$ by subtracting the stroke H from the sprung displacement $z_2$.

Step 830: The CPU acquires information related to a current position of the vehicle 10 from the positional information acquiring device 33.

Step 835: Similarly to Step 705, the CPU determines a traveling direction Td of the vehicle 10 based on a current position in a previous case and a current position in a present case.

Step 840: The CPU determines a current position of each wheel 11 based on the current position of the vehicle 10 by referring to the traveling direction Td and the positional relationship data.

Step 845: The CPU stores the unsprung displacement $z_1$ and the current position of the wheel 11 (positional information) in the storage device 30a while linking the unsprung displacement $z_1$ and the current position to (associating the unsprung displacement $z_1$ and the current position with) a current time. The CPU may store the unsprung displacement $z_1$ and the current position of the wheel 11 in the storage device 30a in association with each other (in combination).

Collected Data Transmission

Figure 9:
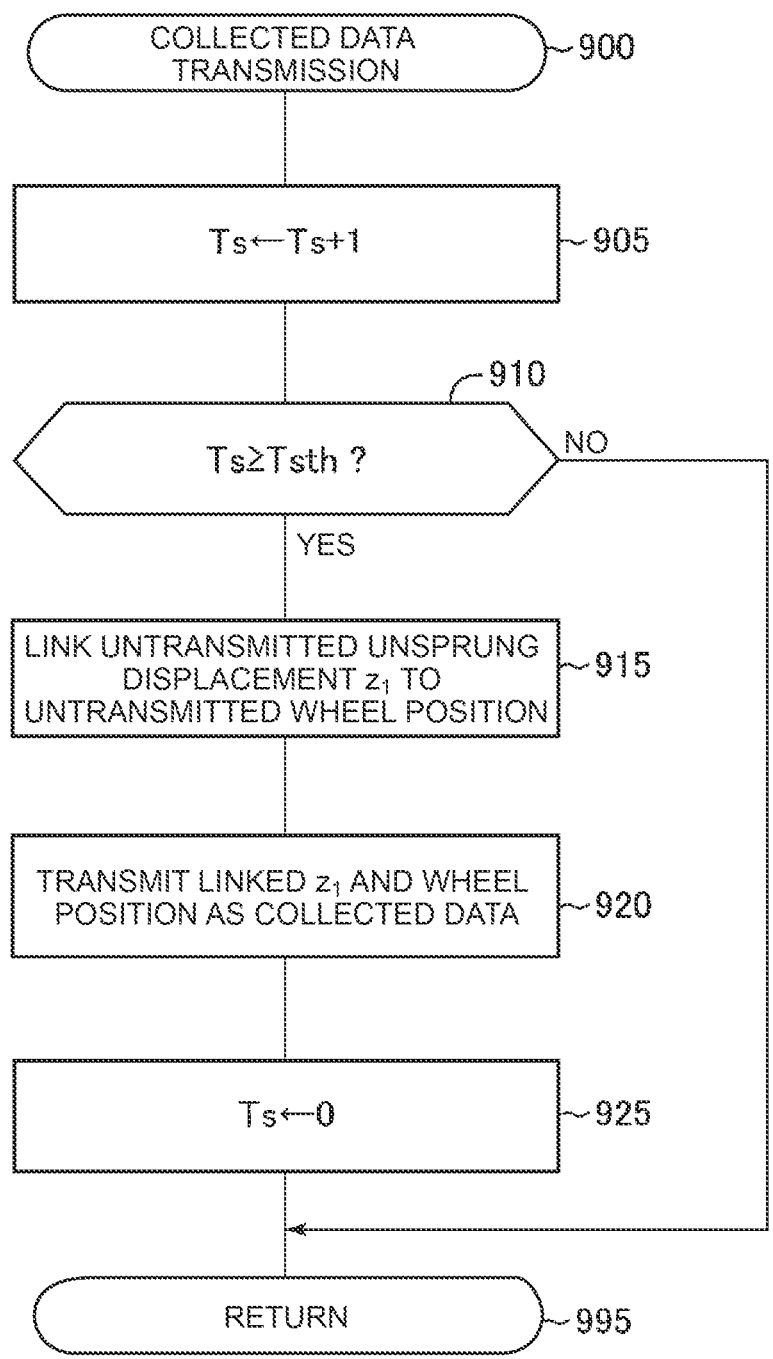
FIG. 9 is a flowchart illustrating a routine to be executed by the CPU of the electronic control unit.

The CPU of the ECU 30 executes a collected data transmission routine illustrated in a flowchart of FIG. 9 every time a predetermined period has elapsed.

At a predetermined timing, the CPU starts a process from Step 900 of FIG. 9, and executes Step 905 and Step 910 in this order.

Step 905: The CPU adds "1" to a value of a transmission timer Ts. The transmission timer Ts counts an elapsed period from a timing when collected data was previously transmitted to the cloud 40 (hereinafter referred to as "previous transmission timing").

Step 910: The CPU determines whether the value of the transmission timer Ts is equal to or larger than a threshold Tsth (positive constant). When the value of the transmission timer Ts is smaller than the threshold Tsth, the CPU determines "No" in Step 910, and proceeds to Step 995 to temporarily terminate this routine. When the value of the transmission timer Ts is equal to or larger than the threshold Tsth, the CPU determines "Yes" in Step 910, and executes Step 915 to Step 925 in this order. Then, the CPU proceeds to Step 995 to temporarily terminate this routine.

Step 915: The CPU links an untransmitted unsprung displacement $z_1$ to untransmitted positional information based on time information. If the unsprung displacement $z_1$ and a current position of the wheel 11 are stored in association with each other, the CPU simply reads the unsprung displacement $z_1$ and the current position.

Step 920: The CPU transmits the unsprung displacement $z_1$ and the positional information linked in Step 915 to the cloud 40 as collected data.

Step 925: The CPU sets the value of the transmission timer Ts to "0".

When the management server 42 in the cloud 40 receives the collected data transmitted in Step 920, the management server 42 writes the collected data into "preview reference data 45 stored in storage device 44". When an unsprung displacement $z_1$ linked to the same positional information has already been written in the preview reference data 45, the management server 42 writes the unsprung displacement $z_1$ contained in the newly received collected data over the already written unsprung displacement $z_1$. The management server 42 may calculate, as a new unsprung displacement $z_1$, an average or a weighted average of the already written unsprung displacement $z_1$ and the unsprung displacement $z_1$ contained in the newly received collected data, and write the calculated new unsprung displacement $z_1$ as the preview reference data 45.

As understood from the above, the preview damping control is executed by using the target control force Fct calculated based on the unsprung displacement $z_1$. Therefore, the vibration of the sprung portion 51 can be reduced appropriately and the damping performance of the preview damping control can be improved as compared to the preview damping control to be executed by using the target control force Fct calculated based on the road surface displacement $z_0$. Further, the unsprung displacement $z_1$ contained in the preview reference data 45 is acquired based on the sprung acceleration $ddz_2$ detected by the vertical acceleration sensor 31. In other words, the unsprung displacement $z_1$ is acquired based on an acceleration of the sprung portion 51 (sprung acceleration $ddz_2$) actually displaced in the vertical direction due to a displacement of a road surface when the vehicle 10 has actually traveled on the road surface. Therefore, the unsprung displacement $z_1$ contained in the preview reference data 45 has a lower possibility of including a deviation than that of the road surface displacement $z_0$ acquired based on the sensing data acquired by the preview sensor. Thus, the damping performance of the preview damping control can be improved.

First Modified Example

A first modified example differs from the first device only in that the unsprung displacement $z_1$ that may include a deviation as described below is determined to reduce the deviation, and is saved as the preview reference data 45. The deviation contained in the unsprung displacement $z_1$ is described below.

Figure 10:
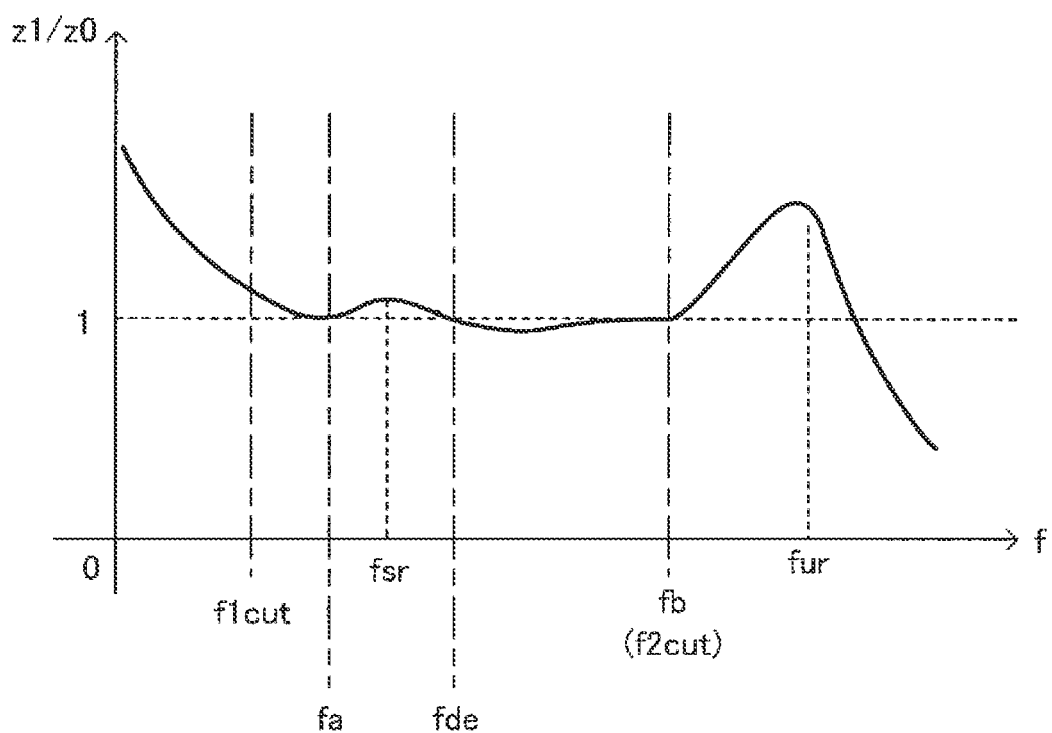
FIG. 10 is a diagram for describing a first modified example of the embodiment of the present disclosure.

When "actual road surface displacement $z_0$ when vehicle 10 travels at given vehicle speed V1a" is an input and "unsprung displacement $z_1$ acquired when vehicle 10 travels on road surface in predetermined zone" is an output, a transfer function between the input and the output is defined as a transfer function $(z_1/z_0)$. A graph of FIG. 10 shows a frequency characteristic of the transfer function. That is, FIG. 10 illustrates the magnitude (gain) of the transfer function $(z_1/z_0)$ relative to a frequency f (Hz) of vibration that occurs in the unsprung portion 50 due to the road surface displacement $z_0$.

The graph illustrated in FIG. 10 shows that the magnitude of the transfer function $(z_1/z_0)$ gradually increases from "1" as the frequency f decreases below "given frequency fa lower than sprung resonance frequency fsr of vehicle 10".

This phenomenon may be caused by a sensor drift (temporal change in zero point) in the vertical acceleration sensor 31. More specifically, the sprung acceleration $ddz_2$ detected by the vertical acceleration sensor 31 includes a relatively large deviation in a low-frequency range equal to or lower than the frequency fa due to the sensor drift occurring in the vertical acceleration sensor 31. Thus, when the unsprung displacement $z_1$ is calculated by using a value obtained through second-order integral of the sprung acceleration $ddz_2$ (that is, the sprung displacement $z_2$), the unsprung displacement $z_1$ includes a relatively large deviation because the sprung acceleration $ddz_2$ includes the deviation in the low-frequency range due to the sensor drift.

The graph illustrated in FIG. 10 also shows that the unsprung portion 50 starts to resonate when the frequency f increases to "given frequency fb higher than sprung resonance frequency fsr", and the resonance of the unsprung portion 50 is maximum when the frequency f is equal to "unsprung resonance frequency fur of vehicle 10 that is higher than frequency fb". Thus, the magnitude of the transfer function $(z_1/z_0)$ gradually increases over "1" as the frequency f increases in a range from the frequency fb to the unsprung resonance frequency fur. The magnitude of the transfer function $(z_1/z_0)$ gradually decreases as the frequency f increases over the unsprung resonance frequency fur. Thus, the degree of correlation between the unsprung displacement $z_1$ and the actual road surface displacement $z_0$ decreases in a high-frequency range higher than the frequency fb.

Irrespective of the type of the vehicle and the vehicle speed, the frequency fa is a value lower than the sprung resonance frequency fsr of each vehicle, and the frequency fb is a value higher than the sprung resonance frequency fsr of each vehicle and lower than the unsprung resonance frequency fur of each vehicle. Irrespective of the type of the vehicle and the vehicle speed, the magnitude of the transfer function $(z_1/z_0)$ gradually increases as the frequency f decreases below the frequency fa, and the magnitude of the transfer function $(z_1/z_0)$ gradually increases as the frequency f increases in the range from the frequency fb to the unsprung resonance frequency fur.

In view of the above, in the first modified example, the unsprung displacement $z_1$ is calculated so that the unsprung displacement $z_1$ calculated by the ECU 30 and stored as the preview reference data 45 is maximally unaffected by the sensor drift in the vertical acceleration sensor 31 and the resonance of the unsprung portion 50 as described below.

More specifically, the ECU 30 uses, as "sprung displacement $z_2$", a value obtained such that time series variations of the value obtained through second-order integral of the sprung acceleration $ddz_2$ acquired from the vertical acceleration sensor 31 are subjected to "band-pass filtering for passing only frequency component in specific frequency range". Further, the ECU 30 uses, as "stroke H", a value obtained such that time series variations of the stroke H acquired from the stroke sensor 32 are subjected to "band-pass filtering for passing only frequency component in specific frequency range". The specific frequency range is a range from "first cutoff frequency f1cut lower than frequency fa" to "frequency fb (hereinafter referred to as "second cutoff frequency f2cut")". The ECU 30 calculates the unsprung displacement $z_1$ by subtracting "stroke H" from "sprung displacement $z_2$".

Therefore, the highly accurate unsprung displacement $z_1$ unaffected by the deviation due to the sensor drift in the vertical acceleration sensor 31 and the deviation due to the resonance of the unsprung portion 50 is saved as the preview reference data 45. Since the highly accurate unsprung displacement $z_1$ is used in the preview damping control, the damping performance of the preview damping control can be improved.

Since the frequency fa is lower than the sprung resonance frequency fsr, the first cutoff frequency f1cut is lower than the sprung resonance frequency fsr. Thus, an unsprung displacement $z_1$ in a case where the frequency f is the sprung resonance frequency fsr is securely reflected in the preview reference data 45. If the unsprung displacement $z_1$ in the case where the frequency f is the sprung resonance frequency fsr is not reflected in the preview reference data 45, the sprung portion 51 resonates even though the preview damping control is performed based on the unsprung displacement $z_1$. Since the unsprung displacement $z_1$ in the case where the frequency f is the sprung resonance frequency fsr is reflected in the preview reference data 45 in the first modified example, the resonance of the sprung portion 51 can securely be reduced through the preview damping control.

Figure 11:
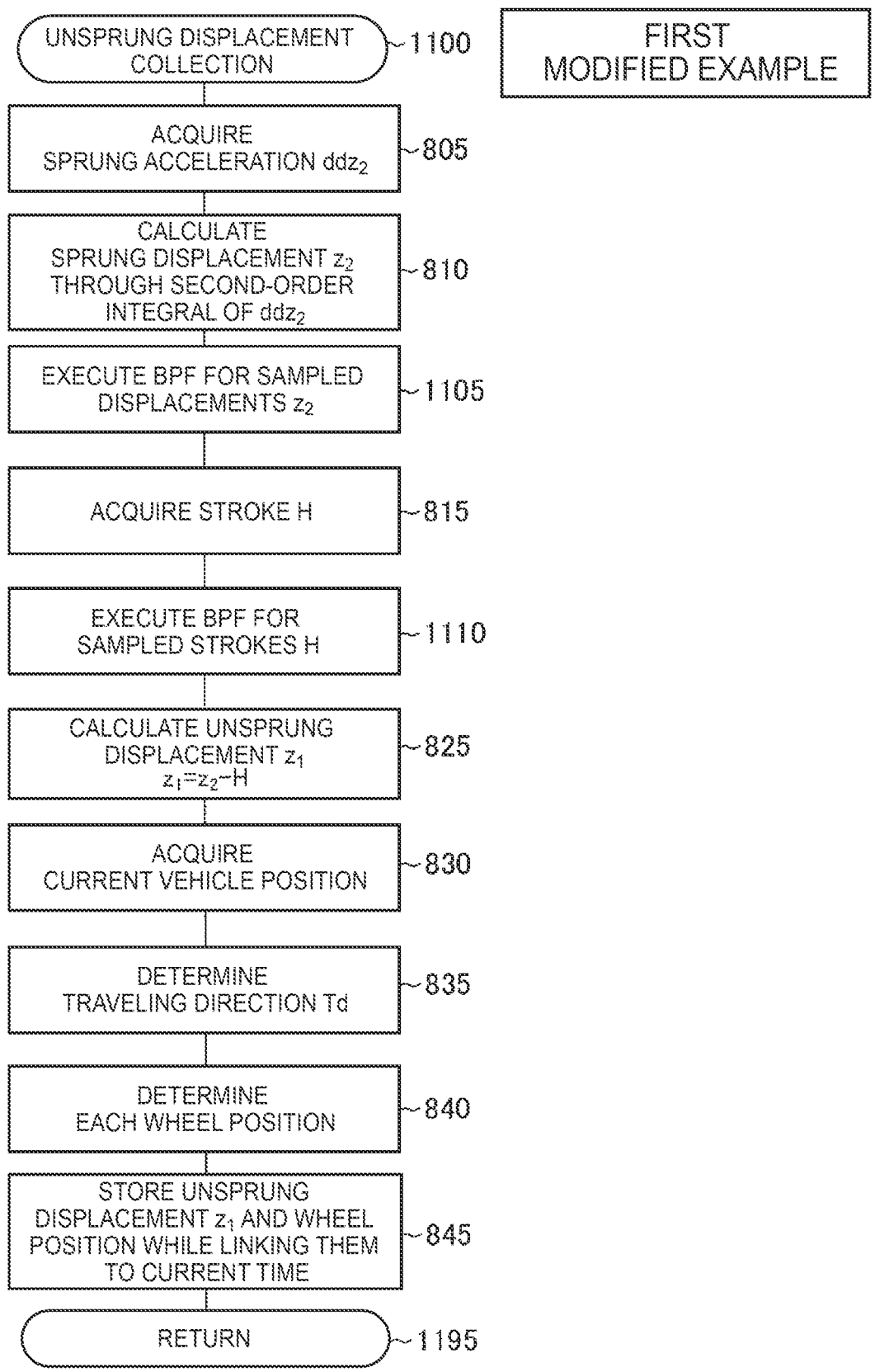
FIG. 11 is a flowchart illustrating a routine to be executed by the CPU of the electronic control unit in the first modified example.

The CPU of the ECU 30 in the first modified example executes an unsprung displacement collection routine illustrated in FIG. 11 every time a predetermined period has elapsed in place of the unsprung displacement collection routine illustrated in FIG. 8. In FIG. 11, steps for performing the same processes as those of the steps in FIG. 8 are represented by the same reference symbols as those used in FIG. 8 to omit their description.

At a predetermined timing, the CPU starts a process from Step 1100 of FIG. 11, executes Step 805 and Step 810 of FIG. 11, and proceeds to Step 1105. The CPU prestores, in the RAM, "sprung displacements $z_2$ obtained through second-order integral of sprung accelerations $ddz_2$" acquired in Step 810 of FIG. 11.

In Step 1105, the CPU acquires, as sampled displacements $z_2$, "necessary number of sprung displacements $z_2$ for band-pass filtering described later" from among the sprung displacements $z_2$ stored in the RAM, and executes band-pass filtering (BPF) for the sampled displacements $z_2$. The CPU acquires, as the sampled displacements $z_2$, the necessary number of sprung displacements $z_2$ in reverse chronological order of storage in the RAM. Therefore, the sampled displacements $z_2$ include a sprung displacement $z_2$ acquired in Step 810 of FIG. 11 in the present routine. The band-pass filtering is a process for passing only a specific frequency component of the sampled displacement $z_2$ that is equal to or higher than the first cutoff frequency f1cut and equal to or lower than the second cutoff frequency f2cut. In other words, the band-pass filtering is a process for removing a frequency component of the sprung displacement $z_2$ that is lower than the first cutoff frequency f1cut, and a frequency component of the sprung displacement $z_2$ that is higher than the second cutoff frequency f2cut. By executing the band-pass filtering, the CPU extracts the sampled displacements $z_2$ in the specific frequency range. Further, the CPU extracts, as "present sprung displacement $z_2$", a sprung displacement $z_2$ corresponding to the sprung displacement $z_2$ acquired in Step 810 of FIG. 11 in the present routine from among the sampled displacements $z_2$ subjected to the band-pass filtering.

After the execution of Step 1105, the CPU executes Step 815 of FIG. 11, and proceeds to Step 1110. The CPU prestores strokes H acquired in Step 815 of FIG. 11 in the RAM.

In Step 1110, the CPU acquires, as sampled strokes H, "necessary number of strokes H for band-pass filtering described later" from among the strokes H stored in the RAM, and executes the band-pass filtering for the sampled strokes H. The CPU acquires, as the sampled strokes H, the necessary number of strokes H in reverse chronological order of storage in the RAM. Therefore, the sampled strokes H include a stroke H acquired in Step 815 of FIG. 11 in the present routine. By executing the band-pass filtering, the CPU extracts the strokes H in the specific frequency range. In other words, the CPU removes a frequency component of the sampled stroke H that is lower than the first cutoff frequency f1cut, and a frequency component of the sampled stroke H that is higher than the second cutoff frequency f2cut. Further, the CPU extracts, as "present stroke H", a stroke H corresponding to the stroke H acquired in Step 815 of FIG. 11 in the present routine from among the sampled strokes H subjected to the band-pass filtering.

In Step 825 of FIG. 11, the CPU acquires an unsprung displacement $z_1$ by subtracting the present stroke H from the present sprung displacement $z_2$. Then, the CPU executes Step 830 to Step 845 of FIG. 11, and proceeds to Step 1195 to temporarily terminate this routine.

Since the unsprung displacement $z_1$ is calculated based on "sprung displacement $z_2$ and stroke H" in the specific frequency range in Step 825 of FIG. 11, "frequency component lower than first cutoff frequency f1cut" and "frequency component higher than second cutoff frequency f2cut" are removed from the unsprung displacement $z_1$.

The CPU may calculate an unsprung displacement $z_1$ based on a sprung displacement $z_2$ obtained through second-order integral of a sprung acceleration $ddz_2$ acquired by the vertical acceleration sensor 31 and a stroke H acquired by the stroke sensor 32, and execute the band-pass filtering for a necessary number of unsprung displacements $z_1$ that are necessary for the band-pass filtering and include the calculated unsprung displacement $z_1$.

It is only necessary that the frequency component lower than the first cutoff frequency f1cut and the frequency component higher than the second cutoff frequency f2cut be removed, through the band-pass filtering, from the unsprung displacement $z_1$ calculated by the damping control device 20 before the unsprung displacement $z_1$ is stored as the preview reference data 45. For example, the management server 42 may execute the band-pass filtering. This example is described below.

The CPU of the ECU 30 executes the routine illustrated in FIG. 8 in place of the routine illustrated in FIG. 11. When the CPU determines "Yes" in Step 910 of the collected data transmission routine illustrated in FIG. 9, the CPU proceeds to Step 920 without executing Step 915. In Step 920, the CPU transmits a vehicle identification (ID) serving as a unique identifier of the vehicle 10, time information, and "unsprung displacement $z_1$ and positional information" linked to the time information to the cloud 40 as collected data. When the management server 42 receives the collected data, the management server 42 executes the band-pass filtering for the unsprung displacement $z_1$ based on the time information and the unsprung displacement $z_1$ contained in the collected data of the same vehicle ID. The management server 42 registers, in the preview reference data 45, the unsprung displacement $z_1$ subjected to the band-pass filtering and the positional information while linking the unsprung displacement $z_1$ and the positional information to each other based on the time information. The management server executes the band-pass filtering by using a first cutoff frequency f1cut and a second cutoff frequency f2cut associated with each type of vehicle identified by the vehicle ID. The first cutoff frequency f1cut associated with each type of vehicle is preset to a value lower than a sprung resonance frequency fsr of this type of vehicle. The second cutoff frequency f2cut associated with each type of vehicle is preset to a value between the sprung resonance frequency fsr of this type of vehicle and an unsprung resonance frequency fur of this type of vehicle.

As understood from the example described above, the frequency component lower than the first cutoff frequency f1cut is removed from the unsprung displacement $z_1$ contained in the preview reference data 45. Therefore, an unsprung displacement $z_1$ in the low-frequency range having a strong possibility of including a deviation due to the sensor drift is not used in the preview damping control. Thus, the damping performance of the preview damping control can be improved, and the possibility of vibration of the sprung portion 51 can be reduced through the preview damping control. Further, the frequency component higher than the second cutoff frequency f2cut is removed from the unsprung displacement $z_1$ contained in the preview reference data 45. Therefore, an unsprung displacement $z_1$ in the high-frequency range having a large deviation due to the resonance of the unsprung portion 50 is not used in the preview damping control. Thus, the damping performance of the preview damping control can be improved, and the possibility of vibration of the sprung portion 51 can be reduced through the preview damping control.

The second cutoff frequency f2cut may be set to a value different from the frequency fb as long as the value is higher than the sprung resonance frequency fsr and lower than the unsprung resonance frequency fur.

The CPU (or the management server 42) may execute, in place of the band-pass filtering, "high-pass filtering for removing frequency component of unsprung displacement $z_1$ that is lower than first cutoff frequency" or "low-pass filtering for removing frequency component of unsprung displacement $z_1$ that is higher than second cutoff frequency". As a result, the unsprung displacement $z_1$ subjected to the high-pass filtering or the low-pass filtering is stored as the preview reference data 45.

Second Modified Example

In a second modified example, unfiltered unsprung displacements $z_1$ are stored as the preview reference data 45. In the preview reference data 45 of the second modified example, positional information, an unsprung displacement $z_1$ at a position indicated by the positional information, and a vehicle speed V1 during traveling at the position are linked to each other. In the second modified example, the ECU 30 acquires, from the cloud 40, a plurality of "unsprung displacements $z_1$, vehicle speeds V1, and pieces of positional information" in a sampling zone including a predicted passing position.

The ECU 30 calculates an average vehicle speed V1ave of the vehicle 10 when the vehicle 10 travels in the sampling zone based on the acquired vehicle speeds V1 in the sampling zone. The ECU 30 calculates time series variations of unsprung displacements $z_1$ in the sampling zone (hereinafter referred to as "sampled displacements $z_1$") when the vehicle 10 travels in the sampling zone at the average vehicle speed V1ave. The ECU 30 acquires "low-frequency-side unsprung displacements $z_1$" in the sampling zone by subjecting the time series variations of the sampled displacements $z_1$ to low-pass filtering for removing a frequency component higher than a predetermined discrimination threshold frequency fde. The discrimination threshold frequency fde is preset to a predetermined value equal to or higher than the sprung resonance frequency fsr of the vehicle 10 and equal to or lower than the unsprung resonance frequency fur of the vehicle 10 (see FIG. 10). In the second modified example, an unsprung displacement $z_1$ at the predicted passing position is acquired as "low-frequency-side displacement $z_1$LO" by using "low-frequency-side unsprung displacements $z_1$" in the sampling zone.

In the second modified example, "high-frequency-side unsprung displacements $z_1$" in the sampling zone are acquired by subjecting the time series variations of the sampled displacements to high-pass filtering for removing a frequency component equal to or lower than the discrimination threshold frequency fde. In the second modified example, an unsprung displacement $z_1$ at the predicted passing position is acquired as "high-frequency-side displacement $z_1$HI" by using "high-frequency-side unsprung displacements $z_1$" in the sampling zone.

Subsequently, in the second modified example, a target control force Fct is calculated based on Expression (14).

$$Fct = \beta_{LO} \times z_1 LO + \beta_{HI} \times z_1 HI \quad (14)$$

That is, the damping control device 20 in the second modified example calculates a low-frequency-side target control force FctLO by multiplying the low-frequency-side displacement $z_1$LO by a predetermined low-frequency-side gain $\beta_{LO}$ (positive constant). Further, the damping control device 20 calculates a high-frequency-side target control force FctHI by multiplying the high-frequency-side displacement $z_1$HI by a predetermined high-frequency-side gain $\beta_{HI}$ (positive constant). The damping control device 20 calculates the target control force Fct by adding the low-frequency-side target control force FctLO and the high-frequency-side target control force FctHI together. The high-frequency-side gain $\beta_{HI}$ is preset to a value larger than the low-frequency-side gain $\beta_{LO}$.

There is a strong possibility that a sprung acceleration $ddz_2$ detected by the vertical acceleration sensor 31 in a high-frequency-side frequency range higher than the discrimination threshold frequency fde is lower than a sprung acceleration $ddz_2$ related to an actual road surface displacement $z_0$ as compared to a sprung acceleration $ddz_2$ in a low-frequency-side frequency range equal to or lower than the discrimination threshold frequency fde. The following three reasons are conceivable.

A sensor gain of the vertical acceleration sensor 31 in the high-frequency-side frequency range is smaller than a sensor gain of the vertical acceleration sensor 31 in the low-frequency-side frequency range.

Influence of deflection of the tire.

A signal indicating the sprung acceleration $ddz_2$ on the high-frequency side may be lost.

This phenomenon may occur because the rate of change in an output value of the vertical acceleration sensor 31 on the high-frequency side is high in comparison with a sampling period of the output value of the vertical acceleration sensor 31. The stroke sensor 32 has the same phenomenon as that of the vertical acceleration sensor 31.

Thus, there is a strong possibility that an unsprung displacement $z_1$ in the high-frequency-side frequency range that is acquired based on the sprung acceleration $ddz_2$ is smaller than an unsprung displacement $z_1$ related to the actual road surface displacement $z_0$ as compared to an unsprung displacement $z_1$ in the low-frequency-side frequency range.

In view of the above, the high-frequency-side gain $\beta_{HI}$ is set to a value larger than the low-frequency-side gain $\beta_{LO}$ in the second modified example. Therefore, it is possible to reduce the possibility that the target control force Fct corresponding to the unsprung displacement $z_1$ in the high-frequency-side frequency range is smaller than the control force necessary for the actual road surface displacement $z_0$. Thus, the damping performance of the preview damping control for the sprung portion 51 can be improved.

The second modified example is described in more detail. The gain βf in Expression (12) and the gain βr in Expression (13) are preset to calculate an ideal target control force Fct (hereinafter referred to as "ideal control force") for damping the sprung portion 51 for the actual road surface displacement $z_0$. The gains βf and βr may be referred to as "reference gains". When the target control force Fct is calculated by using the reference gain, there is a strong possibility that the target control force Fct for the unsprung displacement $z_1$ in the high-frequency-side frequency range is smaller than "ideal control force for actual road surface displacement $z_0$".

In the second modified example, a high-frequency-side gain $\beta_{HI}$ for the front wheel 11F is set to a value larger than the gain βf, and a low-frequency-side gain $\beta_{LO}$ for the front wheel 11F is set to a value equal to the gain βf. Similarly, in the second modified example, a high-frequency-side gain $\beta_{HI}$ for the rear wheel 11R is set to a value larger than the gain Pr, and a low-frequency-side gain βm for the rear wheel 11R is set to a value equal to the gain Pr. Thus, it is possible to reduce the possibility that the target control force Fct is smaller than the ideal control force due to the phenomenon that the target control force Fct for the unsprung displacement $z_1$ in the high-frequency-side frequency range is smaller than "ideal control force for actual road surface displacement $z_0$".

Figure 12:
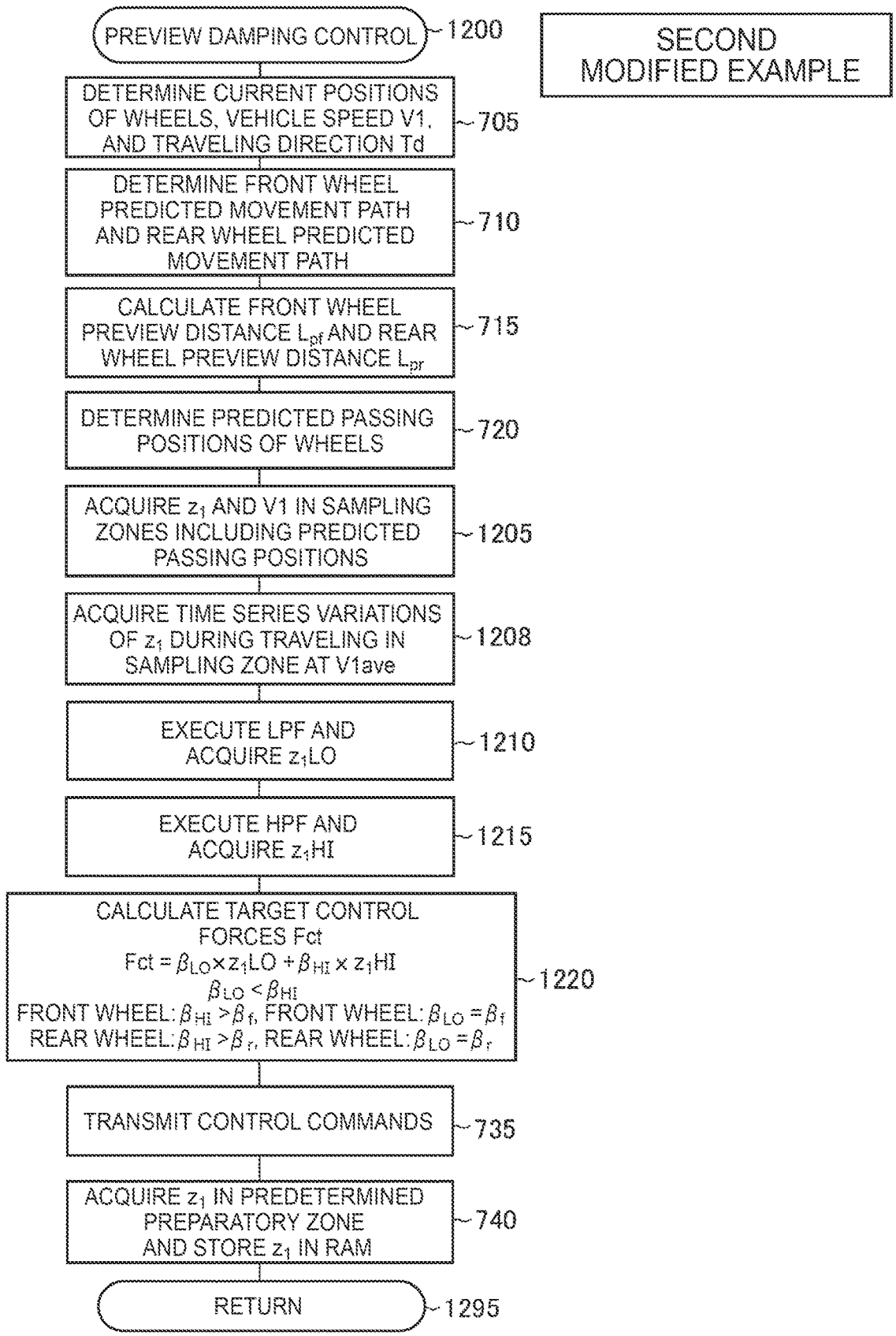
FIG. 12 is a flowchart illustrating a routine to be executed by the CPU of the electronic control unit in a second modified example of the embodiment of the present disclosure.

The CPU of the ECU 30 in the second modified example executes a preview damping control routine illustrated in FIG. 12 every time a predetermined period has elapsed in place of the preview damping control routine illustrated in FIG. 7. In FIG. 12, steps for performing the same processes as those of the steps in FIG. 7 are represented by the same reference symbols as those used in FIG. 7 to omit their description.

At a predetermined timing, the CPU starts a process from Step 1200 of FIG. 12, and executes Step 705 to Step 720 of FIG. 12. Then, the CPU executes Step 1205 to Step 1220.

Step 1205: The CPU acquires a plurality of unsprung displacements $z_1$ in predetermined sampling zones including predicted passing positions as sampled displacements $z_1$, and acquires a plurality of vehicle speeds V1 in the sampling zones. The sampling zone of the front wheel 11F has a start point at a current position of the front wheel 11F, and has an end point at a position spaced away from the current position by a predetermined front wheel sampling distance along the front wheel predicted movement path. The front wheel sampling distance is set to a value that is equal to or larger than the front wheel preview distance Lpf and is sufficient to acquire a necessary number of unsprung displacements $z_1$ for low-pass filtering and high-pass filtering described later. Similarly, the sampling zone of the rear wheel 11R has a start point at a current position of the rear wheel 11R, and has an end point at a position spaced away from the current position by a predetermined rear wheel sampling distance along the rear wheel predicted movement path. The rear wheel sampling distance is set to a value that is equal to or larger than the rear wheel preview distance Lpr and is sufficient to acquire a necessary number of unsprung displacements $z_1$ for low-pass filtering and high-pass filtering described later. The start point of each sampling zone need not be the current position of the wheel 11, and the sampling zone may be any zone having a predetermined distance including the predicted passing position. For example, the predicted passing position may be set as the start point of the sampling zone.

Step 1208: The CPU calculates an average vehicle speed V1ave based on the vehicle speeds V1 in each sampling zone, and calculates time series variations of the sampled displacements $z_1$ when the vehicle 10 travels in the sampling zone at the average vehicle speed V1ave.

Step 1210: The CPU executes "low-pass filtering (LPF) whose cutoff frequency is discrimination threshold frequency fde" for the time series variations of the sampled displacements $z_1$, and acquires, as a low-frequency-side displacement $z_1$LO, an unsprung displacement $z_1$ at the predicted passing position from among the sampled displacements $z_1$ subjected to the low-pass filtering.

Step 1215: The CPU executes "high-pass filtering (HPF) whose cutoff frequency is discrimination threshold frequency fde" for the time series variations of the sampled displacements $z_1$, and acquires, as a high-frequency-side displacement $z_1$HI, an unsprung displacement $z_1$ at the predicted passing position from among the sampled displacements $z_1$ subjected to the high-pass filtering.

Step 1220: The CPU acquires a target control force Fct by applying the low-frequency-side displacement $z_1$LO and the high-frequency-side displacement $z_1$HI to Expression (14). As described above, the low-frequency-side gain $\beta_{LO}$ for the front wheel 11F and the low-frequency-side gain $\beta_{LO}$ for the rear wheel 11R are preset, and the high-frequency-side gain $\beta_{HI}$ for the front wheel 11F and the high-frequency-side gain $\beta_{HI}$ for the rear wheel 11R are preset.

Then, the CPU executes Step 735 and Step 740 of FIG. 12, and proceeds to Step 1295 to temporarily terminate this routine.

As understood from the example described above, the high-frequency-side gain $\beta_{HI}$ is preset to a value larger than the low-frequency-side gain $\beta_{LO}$. Therefore, it is possible to reduce the possibility that the target control force Fct for the unsprung displacement $z_1$ in the high-frequency-side frequency range is smaller than "ideal control force for actual road surface displacement $z_0$". Thus, the damping performance of the preview damping control for the sprung portion 51 can be improved.

Positional information and "unsprung displacement $z_1$ subjected to low-pass filtering and unsprung displacement $z_1$ subjected to high-pass filtering" may be stored as the preview reference data 45 while being linked to each other. In this case, in Step 1205 of the routine illustrated in FIG. 12, the CPU acquires an unsprung displacement $z_1$ subjected to the low-pass filtering at the predicted passing position as the low-frequency-side displacement $z_1LO$, and acquires an unsprung displacement $z_1$ subjected to the high-pass filtering at the predicted passing position as the high-frequency-side displacement $z_1HI$. Then, the CPU proceeds to Step 1220 without executing Step 1208, Step 1210, and Step 1215. In the routine illustrated in FIG. 8, when calculating the unsprung displacement $z_1$ based on the sprung acceleration $ddz_2$, the CPU executes the low-pass filtering based on an unsprung displacement $z_1$ in a present case and a necessary number of unsprung displacements $z_1$ for the low-pass filtering in an immediately preceding case, and executes the high-pass filtering based on the unsprung displacement $z_1$ in the present case and a necessary number of unsprung displacements $z_1$ for the high-pass filtering in the immediately preceding case. In the routine illustrated in FIG. 9, the CPU transmits, to the cloud 40, the unsprung displacement $z_1$ subjected to the low-pass filtering in the present case and the unsprung displacement $z_1$ subjected to the high-pass filtering in the present case while linking the unsprung displacements $z_1$ to the positional information. Thus, the unsprung displacement $z_1$ subjected to the low-pass filtering and the unsprung displacement $z_1$ subjected to the high-pass filtering are saved as the preview reference data 45.

When the second modified example is applied to the first modified example, the discrimination threshold frequency fde is preset to a predetermined value equal to or higher than the sprung resonance frequency fsr of the vehicle 10 and equal to or lower than the second cutoff frequency f2cut.

The present disclosure is not limited to the embodiment and the modified examples described above, and various modified examples may be adopted within the scope of the present disclosure.

An unsprung displacement $z_1$ and a current position of each wheel (positional information) when a measurement-specific vehicle (general vehicle) other than the vehicle 10 has actually traveled on a road surface may be collected, and the collected "unsprung displacement $z_1$ and positional information" may be transmitted to the cloud 40 as collected data. In this case, the damping control device 20 of the vehicle 10 need not execute the routines illustrated in FIG. 8 and FIG. 9. The measurement-specific vehicle includes the vertical acceleration sensors 31FR to 31RL, the stroke sensors 32FR to 32RL, the positional information acquiring device 33, the wireless communication device 34, and the storage device 30a illustrated in FIG. 3, and executes the routines illustrated in FIG. 8 and FIG. 9.

The measurement-specific vehicle sequentially transmits pieces of collected data to the cloud 40, and the cloud 40 updates the preview reference data 45 based on each piece of collected data. Therefore, the latest unsprung displacement $z_1$ related to the road surface is stored in the preview reference data 45. Thus, the damping control device 20 can execute preview damping control appropriate to the latest condition of the road surface.

When the first modified example is applied to the measurement-specific vehicle, the measurement-specific vehicle transmits an unsprung displacement $z_1$ subjected to the band-pass filtering to the cloud 40 as collected data. The first cutoff frequency f1cut of the band-pass filtering is set to a value lower than a sprung resonance frequency fsr of the measurement-specific vehicle. The second cutoff frequency f2cut of the band-pass filtering is set to a value between the sprung resonance frequency fsr of the measurement-specific vehicle and an unsprung resonance frequency fur of the measurement-specific vehicle.

When the second modified example is applied to the measurement-specific vehicle, the measurement-specific vehicle transmits, to the management server 42, collected data in which an unsprung displacement $z_1$, a vehicle speed V1 when the unsprung displacement $z_1$ is acquired, and positional information are linked to each other. When the second modified example is applied to the first modified example in this case, the discrimination threshold frequency fde is preset to a predetermined value equal to or higher than the sprung resonance frequency fsr of the measurement-specific vehicle and equal to or lower than the second cutoff frequency f2cut.

The preview reference data 45 need not be stored in the storage device 44 in the cloud 40, but may be stored in the storage device 30a. In this case, the CPU only needs to store collected data directly in the storage device 30a, and need not transmit the collected data to the cloud 40.

When a traveling route of the vehicle 10 is determined in advance, the CPU may download preview reference data 45 of the traveling route in advance from the cloud 40 and store the preview reference data 45 in the storage device 30a before the vehicle 10 starts to travel along the traveling route.

In place of the unsprung displacement $z_1$, the unsprung speed $dz_1$ may be stored in the preview reference data 45 while being linked to the positional information. In this case, in Step 725 of FIG. 7, the CPU acquires the unsprung speed $dz_1$, and calculates the unsprung displacement $z_1$ by integrating the acquired unsprung speed $dz_1$. In Step 730 of FIG. 7, the CPU calculates the target control force Fct based on the unsprung displacement $z_1$. In Step 825 of FIG. 8, the CPU calculates the unsprung speed $dz_1$ by differentiating the unsprung displacement $z_1$. In Step 845, the CPU stores the unsprung speed $dz_1$ and the positional information in the storage device 30a while linking the unsprung speed $dz_1$ and the positional information to the current time. In the routine illustrated in FIG. 9, the CPU transmits, in place of the unsprung displacement $z_1$, the unsprung speed $dz_1$ and the positional information to the cloud 40 while linking the unsprung speed $dz_1$ and the positional information to each other. Various methods may be applied as the method for calculating the unsprung speed $dz_1$. For example, the CPU may calculate the unsprung speed $dz_1$ by calculating a sprung speed $dz_2$ through first-order integral of a sprung acceleration $ddz_2$, calculating a stroke speed $(dz_2-dz_1)$ by differentiating a stroke amount, and subtracting the stroke speed $(dz_2-dz_1)$ from the sprung speed $dz_2$.

The unsprung displacement $z_1$ and the unsprung speed $dz_1$ may be stored in the preview reference data 45 while being linked to the positional information. In this case, the CPU calculates the target control force Fct by using Expression (10).

"Unsprung displacement $z_1$ and/or unsprung speed $dz_1$" stored in the preview reference data 45 may be referred to as "unsprung condition amount".

The calculation process for the unsprung displacement $z_1$ is not limited to the process described in Step 825 of FIG. 8. For example, the calculation process may be any one of processes in the following examples (first example and second example).

The first example is described. In this example, the damping control device 20 includes unsprung vertical acceleration sensors configured to detect vertical accelerations of the unsprung portions 50 at the positions of the wheels 11FR to 11RL (unsprung accelerations $ddz_1FR$ to $ddz_1RL$). The CPU acquires the unsprung displacement $z_1$ through second-order integral of the unsprung accelerations $ddz_1FR$ to $ddz_1RL$.

The second example is described. In this example, the damping control device 20 estimates the unsprung displacement $z_1$ by using an observer (not illustrated) based on the sprung accelerations $ddz_2FR$ to $ddz_2RL$, the unsprung accelerations $ddz_1FR$ to $ddz_1RL$, or the strokes Hfr to Hrl detected by the stroke sensors 32FR to 32RL.

The vertical acceleration sensors 31 may be provided in correspondence with at least three wheels. The sprung acceleration corresponding to the wheel to which the vertical acceleration sensor 31 is not provided can be estimated based on the sprung accelerations detected by the three vertical acceleration sensors 31.

The calculation process for the target control force Fcrt of the rear wheel 11R is not limited to that in the example described above. For example, the CPU may calculate the target control force Fcrt based on the unsprung displacement $z_1$ at the current position of the front wheel 11F at the current time tp, and transmit a control command containing the target control force Fcrt to the rear wheel active actuator 17R at a timing delayed by a period (L/V–tpr) from the current time tp. That is, the CPU may transmit the control command containing the target control force Fcrt to the rear wheel active actuator 17R at a timing when the rear wheel 11R reaches a point behind the current position of the front wheel 11F by the rear wheel preview distance Lpr. The unsprung displacement $z_1$ at the current position of the front wheel 11F may be acquired from the preview reference data 45, or may be acquired based on the sprung acceleration $ddz_2$ or the unsprung acceleration $ddz_1$ corresponding to the position of the front wheel 11F.

Another method is described next. The CPU determines, independently of the front wheel predicted movement path, the rear wheel predicted movement path based on the current position of the rear wheel 11R, the traveling direction Td of the vehicle 10, and the positional relationship data, and determines, as the rear wheel predicted passing position, a position spaced away by the rear wheel preview distance Lpr along the rear wheel predicted movement path. The CPU acquires the unsprung displacement $z_1$ at the rear wheel predicted passing position, and calculates the target control force Fcrt of the rear wheel 11R based on the acquired unsprung displacement $z_1$.

The vehicle speed V1 and the traveling direction Td are acquired based on the current position of the vehicle 10 that is acquired by the GNSS receiver. The present disclosure is not limited to this case. For example, the damping control device 20 includes "wheel speed sensor and yaw rate sensor" (not illustrated). The wheel speed sensor detects a rotation speed of the wheel 11. The CPU may calculate the vehicle speed V1 based on the rotation speed of the wheel 11. The yaw rate sensor detects a yaw rate of the vehicle 10. The CPU may acquire the traveling direction Td based on the yaw rate and the vehicle speed V1.

The suspensions 13FR to 13RL may be any type of suspension as long as the wheels 11FR to 11RL are allowed to be displaced in the vertical direction relative to the vehicle body 10a. The suspension springs 16FR to 16RL may be arbitrary springs such as compression coil springs or air springs.

In the embodiment described above, the active actuators 17FR to 17RL are provided in correspondence with the respective wheels 11, but one active actuator 17 may be provided to at least one wheel 11. For example, the vehicle 10 may have only the front wheel active actuators 17F or the rear wheel active actuators 17R.

In the embodiment and the modified examples described above, the active actuator 17 is used as the control force generating device, but the control force generating device is not limited to the active actuator 17. That is, the control force generating device may be an actuator configured to adjustably generate a vertical control force for damping the sprung portion 51 based on a control command containing the target control force.

The control force generating device may be an active stabilizer device (not illustrated). The active stabilizer device includes a front wheel active stabilizer and a rear wheel active stabilizer. When the front wheel active stabilizer generates a vertical control force between the sprung portion 51 and the unsprung portion 50 corresponding to the left front wheel 11FL (left front wheel control force), the front wheel active stabilizer generates control force in a direction opposite to the direction of the left front wheel control force between the sprung portion 51 and the unsprung portion 50 corresponding to the right front wheel 11FR (right front wheel control force). Similarly, when the rear wheel active stabilizer generates a vertical control force between the sprung portion 51 and the unsprung portion 50 corresponding to the left rear wheel 11RL (left rear wheel control force), the rear wheel active stabilizer generates control force in a direction opposite to the direction of the left rear wheel control force between the sprung portion 51 and the unsprung portion 50 corresponding to the right rear wheel 11RR (right rear wheel control force). The structure of the active stabilizer device is incorporated herein by reference to Japanese Unexamined Patent Application Publication No. 2009-96366 (JP 2009-96366 A). The active stabilizer device may include at least one of the front wheel active stabilizer and the rear wheel active stabilizer.

The control force generating device may be a device configured to generate vertical control forces Fc based on geometry of the suspensions 13FR to 13RL by increasing or reducing braking or driving forces on the wheels 11 of the vehicle 10. The structure of this device is incorporated herein by reference to, for example, Japanese Unexamined Patent Application Publication No. 2016-107778 (JP 2016-107778 A). Using a related-art method, the ECU 30 calculates braking or driving forces for generating control forces Fc corresponding to target control forces Fct. The device includes driving devices (for example, in-wheel motors) configured to apply driving forces to the wheels 11, and braking devices (brakes) configured to apply braking forces to the wheels 11. The driving device may be a motor or an engine configured to apply driving forces to the front wheels, the rear wheels, or the four wheels. The control force generating device may include at least one of the driving device and the braking device.

The control force generating device may be each of the adjustable shock absorbers 15FR to 15RL. In this case, the ECU 30 controls the damping coefficients C of the shock absorbers 15FR to 15RL to change damping forces of the shock absorbers 15FR to 15RL by values corresponding to target control forces Fct.

What is claimed is:
1. A damping control device for a vehicle, comprising:
    a control force generating device configured to generate a vertical control force for damping a sprung portion of the vehicle between at least one wheel and a portion of a vehicle body that corresponds to a position of the wheel; and an electronic control unit configured to control the control force generating device and to change the control force, wherein the electronic control unit is configured to:

acquire, as a preview condition amount, an unsprung condition amount at a predicted passing position where the wheel of the vehicle is predicted to pass at a timing when a predetermined period has elapsed from a current time, based on preview reference data being sets of data in which unsprung condition amounts and pieces of positional information are linked to each other, the unsprung condition amounts indicating a displacement condition of an unsprung portion actually displaced in a vertical direction due to a displacement of a road surface that is acquired when at least one of the vehicle and another vehicle has actually traveled on the road surface, the pieces of positional information being available to determine a position of the wheel when the unsprung condition amount is acquired; and execute, at a timing when the wheel passes through the predicted passing position, preview damping control for controlling the control force generating device to cause the control force generated by the control force generating device to agree with a target control force being a target value of the control force that is calculated based on the preview condition amount, wherein the preview reference data is wirelessly acquired by the electronic control unit from a storage device of a management server.

2. The damping control device according to claim 1, wherein the unsprung condition amount contained in the preview reference data is an unsprung condition amount subjected to filtering for removing a frequency component lower than a predetermined first cutoff frequency that is lower than a predetermined sprung resonance frequency.

3. The damping control device according to claim 1, wherein the unsprung condition amount contained in the preview reference data is an unsprung condition amount subjected to filtering for removing a frequency component higher than a predetermined second cutoff frequency between a sprung resonance frequency of a predetermined vehicle and an unsprung resonance frequency of the predetermined vehicle.

4. The damping control device according to claim 1, wherein the unsprung condition amount contained in the preview reference data is an unsprung condition amount subjected to filtering for removing a frequency component lower than a predetermined first cutoff frequency that is lower than a predetermined sprung resonance frequency, and removing a frequency component higher than a predetermined second cutoff frequency between the sprung resonance frequency and an unsprung resonance frequency of the vehicle.

5. The damping control device according to claim 1, wherein the electronic control unit is configured to:

acquire, based on the preview reference data, an unsprung condition amount at the predicted passing position as a low-frequency-side unsprung condition amount from among unsprung condition amounts from which a frequency component higher than a predetermined discrimination threshold frequency is removed, and acquire, based on the preview reference data, an unsprung condition amount at the predicted passing position as a high-frequency-side unsprung condition amount from among unsprung condition amounts from which a frequency component equal to or lower than the discrimination threshold frequency is removed; and acquire the target control force by adding together a value obtained by multiplying the low-frequency-side unsprung condition amount by a predetermined low-frequency-side gain and a value obtained by multiplying the high-frequency-side unsprung condition amount by a predetermined high-frequency-side gain larger than the low-frequency-side gain.

6. The damping control device according to claim 1, wherein the unsprung condition amount contained in the preview reference data is an unsprung displacement or a speed of the unsprung displacement, the unsprung displacement being a vertical displacement of the unsprung portion that is acquired based on a vertical motion condition amount of at least one of the sprung portion and the unsprung portion.

7. A damping control system comprising:

a vehicle configured to control a control force generating device to change a vertical control force for damping a sprung portion, the control force generating device being configured to generate the control force between at least one wheel and a portion of a vehicle body that corresponds to a position of the wheel; and a management server having a storage device configured to connect to the vehicle via a wireless network, and prestores preview reference data being sets of data in which unsprung condition amounts and pieces of positional information are linked to each other, the unsprung condition amounts indicating a displacement condition of an unsprung portion actually displaced in a vertical direction due to a displacement of a road surface that is acquired when at least one of the vehicle and another vehicle has actually traveled on the road surface, the pieces of positional information being available to determine a position of the wheel when the unsprung condition amount is acquired, wherein the storage device is configured to provide the preview reference data wirelessly to the vehicle, and the vehicle is configured to:

acquire, as a preview condition amount, an unsprung condition amount at a predicted passing position where the wheel is predicted to pass at a timing when a predetermined period has elapsed from a current time, based on the preview reference data provided by the storage device; and execute, at a timing when the wheel passes through the predicted passing position, preview damping control for controlling the control force generating device to cause the control force generated by the control force generating device to agree with a target control force for damping the sprung portion, the target control force being calculated based on the preview condition amount.

8. A damping control method for controlling a control force generating device to change a vertical control force for damping a sprung portion of a vehicle, the control force generating device being configured to generate the control force between at least one wheel and a portion of a vehicle body that corresponds to a position of the wheel, the method comprising:

acquiring, by the vehicle, as a preview condition amount, an unsprung condition amount at a predicted passing position where the wheel is predicted to pass at a timing when a predetermined period has elapsed from a current time, based on preview reference data being sets of data in which unsprung condition amounts and pieces of positional information are linked to each other, the unsprung condition amounts indicating a displacement condition of an unsprung portion actually displaced in a vertical direction due to a displacement of a road surface that is acquired when at least one of the vehicle and another vehicle has actually traveled on the road surface, the pieces of positional information being available to determine a position of the wheel when the unsprung condition amount is acquired; and controlling, by the vehicle, at a timing when the wheel passes through the predicted passing position, the control force generating device to cause the control force generated by the control force generating device to agree with a target control force for damping the sprung portion, the target control force being calculated based on the acquired preview condition amount, wherein the preview reference data is wirelessly acquired by the vehicle from a storage device of a management server.

9. A data providing device comprising a controller configured to provide preview reference data necessary for a vehicle to execute preview damping control to the vehicle configured to execute the preview damping control, the preview damping control involving controlling a control force generating device to change a vertical control force for damping a sprung portion, the control force generating device being configured to generate the control force between at least one wheel and a portion of a vehicle body that corresponds to a position of the wheel, wherein the preview reference data are sets of data in which unsprung condition amounts and pieces of positional information are linked to each other, the unsprung condition amounts indicating a displacement condition of an unsprung portion actually displaced in a vertical direction due to a displacement of a road surface that is acquired when at least one of the vehicle and another vehicle has actually traveled on the road surface, the pieces of positional information being available to determine a position of the wheel when the unsprung condition amount is acquired, and the vehicle is configured to:
  acquire, as a preview condition amount, an unsprung condition amount at a predicted passing position where the wheel is predicted to pass at a timing when a predetermined period has elapsed from a current time, based on the preview reference data provided from the data providing device; and
  execute, at a timing when the wheel passes through the predicted passing position, the preview damping control for controlling the control force generating device to cause the control force generated by the control force generating device to agree with a target control force being a target value of the control force that is calculated based on the preview condition amount, wherein the preview reference data is wirelessly acquired by the vehicle from the controller.

10. The damping control device according to claim 1, wherein the preview reference data includes the sets of data in which the unsprung condition amounts and the pieces of positional information are linked to each other as an actual value.

11. The damping control system according to claim 7, wherein the preview reference data includes the sets of data in which the unsprung condition amounts and the pieces of positional information are linked to each other as an actual value.

12. The damping control method according to claim 8, wherein the preview reference data includes the sets of data in which the unsprung condition amounts and the pieces of positional information are linked to each other as an actual value.

13. The data providing device according to claim 9, wherein the preview reference data includes the sets of data in which the unsprung condition amounts and the pieces of positional information are linked to each other as an actual value.

* * * * *